United States Patent
Welland et al.

(10) Patent No.: US 10,460,183 B2
(45) Date of Patent: Oct. 29, 2019

(54) METHOD AND SYSTEM FOR PROVIDING BEHAVIOR OF VEHICLE OPERATOR USING VIRTUOUS CYCLE

(71) Applicant: Xevo Inc., Bellevue, WA (US)

(72) Inventors: Robert Victor Welland, Seattle, WA (US); Samuel James McKelvie, Seattle, WA (US); Richard Chia-Tsing Tong, Seattle, WA (US); Noah Harrison Fradin, Seattle, WA (US); Vladimir Sadovsky, Redmond, WA (US)

(73) Assignee: Xevo Inc., Bellevue, WA (US)

( * ) Notice: Subject to any disclaimer, the term of this patent is extended or adjusted under 35 U.S.C. 154(b) by 219 days.

(21) Appl. No.: 15/621,835

(22) Filed: Jun. 13, 2017

(65) Prior Publication Data

US 2017/0357866 A1     Dec. 14, 2017

Related U.S. Application Data

(60) Provisional application No. 62/349,468, filed on Jun. 13, 2016.

(51) Int. Cl.
     *G06N 20/00*      (2019.01)
     *G06K 9/00*      (2006.01)
     (Continued)

(52) U.S. Cl.
     CPC ............ *G06K 9/00812* (2013.01); *B60R 1/00* (2013.01); *G06K 9/00845* (2013.01); *G06K 9/66* (2013.01);
(Continued)

(58) Field of Classification Search
CPC ........ G06K 9/00812; G06K 9/00; G06K 9/56; G06N 20/00; B60R 1/00
See application file for complete search history.

(56) References Cited

U.S. PATENT DOCUMENTS

| 5,170,352 A | 8/1992 | McTamaney et al. |
| 5,465,079 A | 7/1995 | Bouchard et al. |

(Continued)

OTHER PUBLICATIONS

Non-Final Office Action dated Sep. 21, 2018 for U.S. Appl. No. 15/621,723, filed Jun. 13, 2017, 25 Pages.
(Continued)

*Primary Examiner* — Gregory M Desire

(57) ABSTRACT

A method or system is capable of detecting operator behavior ("OB") utilizing a virtuous cycle containing sensors, machine learning center ("MLC"), and cloud based network ("CBN"). In one aspect, the process monitors operator body language captured by interior sensors and captures surrounding information observed by exterior sensors onboard a vehicle as the vehicle is in motion. After selectively recording the captured data in accordance with an OB model generated by MLC, an abnormal OB ("AOB") is detected in accordance with vehicular status signals received by the OB model. Upon rewinding recorded operator body language and the surrounding information leading up to detection of AOB, labeled data associated with AOB is generated. The labeled data is subsequently uploaded to CBN for facilitating OB model training at MLC via a virtuous cycle.

14 Claims, 18 Drawing Sheets

(51) Int. Cl.
  *B60R 1/00* (2006.01)
  *G06K 9/66* (2006.01)
  *H04L 29/08* (2006.01)

(52) U.S. Cl.
  CPC ........ *G06N 20/00* (2019.01); *B60R 2300/105* (2013.01); *B60R 2300/30* (2013.01); *B60R 2300/50* (2013.01); *G06K 9/00791* (2013.01); *H04L 67/12* (2013.01)

(56) References Cited

U.S. PATENT DOCUMENTS

| | | | |
|---|---|---|---|
| 5,910,782 A | | 6/1999 | Schmitt et al. |
| 9,601,018 B2 | | 3/2017 | Cogill et al. |
| 10,241,509 B1 | * | 3/2019 | Fields .................. G07C 5/0808 |
| 2006/0267799 A1 | | 11/2006 | Mendelson |
| 2012/0092190 A1 | | 4/2012 | Stefik et al. |
| 2012/0290215 A1 | | 11/2012 | Adler et al. |
| 2013/0057686 A1 | | 3/2013 | Genc et al. |
| 2013/0246181 A1 | | 9/2013 | Lobsenz |
| 2014/0150100 A1 | * | 5/2014 | Gupta .................. G06F 21/316 726/22 |
| 2014/0223284 A1 | | 8/2014 | Rankin, Jr. et al. |
| 2014/0244150 A1 | | 8/2014 | Boesch et al. |
| 2014/0276090 A1 | | 9/2014 | Breed |
| 2015/0170518 A1 | | 6/2015 | Rodriguez Garza |
| 2015/0294567 A1 | | 10/2015 | De La Plaza Ortega |
| 2016/0042650 A1 | | 2/2016 | Stenneth |
| 2016/0055749 A1 | | 2/2016 | Nicoll et al. |
| 2016/0104486 A1 | | 4/2016 | Penilla et al. |
| 2016/0117866 A1 | | 4/2016 | Stancato et al. |
| 2017/0357866 A1 | * | 12/2017 | Welland ............. G06K 9/00812 |
| 2018/0046870 A1 | * | 2/2018 | Cordell .................. B60Q 9/008 |
| 2019/0213429 A1 | * | 7/2019 | Sicconi ............. G06K 9/00845 |

OTHER PUBLICATIONS

International Search Report for PCT/US2017/037320, publication date of Aug. 25, 2017, Korean Intellectual Property Office, Republic of Korea.
International Search Report for PCT/US2017/037337, publication date of Aug. 16, 2017, United States Patent & Trademark Office.
Final Office Action dated Apr. 10, 2019 for U.S. Appl. No. 15/621,723, filed Jun. 13, 2017, 28 Pages.
Final Office Action dated Apr. 10, 2019 for U.S. Appl. No. 15/621,723 "Method and System for Providing Auto Space Management Using Virtuous Cycle", filed Jun. 13, 2017, First Named Inventor: Robert Welland.

* cited by examiner

METHOD AND SYSTEM FOR PROVIDING BEHAVIOR OF VEHICLE OPERATOR USING VIRTUOUS CYCLE

PRIORITY

This application claims the benefit of priority based upon U.S. Provisional Patent Application having an application Ser. No. 62/349,468, filed on Jun. 13, 2016, and having a title of "Method and System for Providing Intelligent Networks Using Internet, Machine Learning, and Big Data," which is hereby incorporated by reference in its entirety.

RELATED APPLICATION

This application is related to the following co-pending application assigned to the Assignee of the present invention.

a. application Ser. No. 15/621,723, filed Jun. 13, 2017, entitled "Method and Apparatus for Providing Auto Space Management Using Virtuous Cycle," invented by the same inventors.

FIELD

The exemplary embodiment(s) of the present invention relates to the field of communication networks. More specifically, the exemplary embodiment(s) of the present invention relates to a virtuous cycle between cloud, machine learning, and containerized sensors to perform a task.

BACKGROUND

With increasing popularity of automation and intelligent electronic devices, such as computerized machines, IoT (the Internet of Things), smart vehicles, smart phones, drones, mobile devices, airplanes, artificial intelligence ("AI"), the demand of intelligent machine and faster real-time response are increasing. For machine learning to become mainstream, a significant number of pieces, such as data management, model training, and data collection need to be improved.

A conventional type of machine learning is, in itself, an exploratory process which may involve trying different kinds of models, such as convolutional, RNN, attentional, et cetera. Machine learning or training typically concerns a wide variety of hyper-parameters that change the shape of the model and training characteristics. Model training generally requires intensive computation. As such, real-time response via machine learning model can be challenging.

SUMMARY

One embodiment of the presently claimed invention discloses a method or system capable of detecting operator behavior ("OB") utilizing a virtuous cycle containing sensors, machine learning center ("MLC"), and cloud based network ("CBN"). In one aspect, the process monitors operator body language captured by interior sensors and captures surrounding information observed by exterior sensors onboard a vehicle as the vehicle is in motion. For example, an interior camera is activated to capture operator facial expression and activating a motion detector to detect operator body movement. Also, the outward-looking cameras situated on the vehicle are activated to capture images as the vehicle is in motion. After selectively recording the captured data in accordance with an OB model generated by MLC, an abnormal OB ("AOB") is detected in accordance with vehicular status signals received by the OB model. Upon rewinding recorded operator body language and the surrounding information leading up to detection of AOB, labeled data associated with AOB is generated. The labeled data is subsequently uploaded to CBN for facilitating OB model training at MLC via a virtuous cycle.

In one aspect, after separating real-time data from the labeled data, the real-time data is uploaded to the cloud based network in real-time via a wireless communication network. Similarly, upon separating batched data from the labeled data, the batched data is uploaded to the cloud based network at a later time depending on traffic condition(s). After feeding real-time labeled data from the vehicle to the cloud based network for correlating and revising labeled data, the revised labeled data is subsequently forwarded to the machine learning center for training OB model. After training, the trained OB model is pushed to the vehicle for continuing data collection.

In one example, after correlating the labeled data with location information, time stamp, and vicinity traffic condition obtained from the CBN to update correlated labeled data relating to the AOB, the labeled data is correlated with local events, additional sampling data, and weather conditions obtained from the cloud based network to update the correlated labeled data relating to the AOB. The process is capable of correlating the labeled data with historical body language samples relating to the operator body language of OB samples obtained from the CBN for update the correlated labeled data. For example, the labeled data is revised or correlated in response to one of historical samples relating to facial expression, hand movement, body temperature, and audio recording retrieved from the cloud based network.

The containerized OB model is trained in accordance with the correlated labeled data forwarded from the cloud based network to the machine learning center. Upon detecting an event of distracted driver in response to the correlated labeled data updated by the cloud based network, a warning signal is provided to the operator indicating the AOB based on the event of the distracted driver. The event of distracted driver is recorded or stored for future report. Note that the containerized OB model is pushed to an onboard digital processing unit in the vehicle via a wireless communication network.

A network configuration or OB system able to detect OB using a virtuous cycle includes a vehicle, CBN, and LMC. In one embodiment, the vehicle is operated by a driver containing a sensing device configured to collect data relating to operator body language of driver and surrounding information. The vehicle is configured to selectively record surrounding information observed by its onboard sensors in accordance with instructions from an OB model when the vehicle is in motion. The CBN which is wirelessly coupled to the sensing device correlates and generates labeled data associated with OB based on historical OB cloud data and the collected data. MLC coupled to the CBN trains and improves the OB model based on the labeled data from the cloud based network.

In one embodiment, the vehicle includes forward-looking cameras configured to collect real-time images as the vehicle moves across a geographical area. The sensing device of the vehicle includes a memory, controller, and transmitter, wherein the memory stores at least a portion of real-time images collected by the forward-looking cameras installed on the vehicle. The vehicle includes inward-looking cameras configured to collect real-time images relating to driver body language during the vehicle moves across a geographical area. The vehicle is able to detect an AOB based on vehicular status signals generated by a head unit of the vehicle.

In an alternative embodiment, a process configured to detect a sign utilizing a virtuous cycle containing sensors, MLC, and CBN is capable of storing real-time data captured by an onboard outward-looking cameras installed on the vehicle based on instructions from a sign model when the vehicle is driving. After detecting a sign image when the vehicle captures a predefined sample image, the stored real-time data is retrieved from a local memory to compare the predefined sample image against the captured sign image. Upon generating labeled data associated with the sign in response to the stored real-time data and historical cloud data, the labeled data relating to sign reading is uploaded to CBN for facilitating model training relating to the sign model at a machine learning process via a virtuous cycle.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
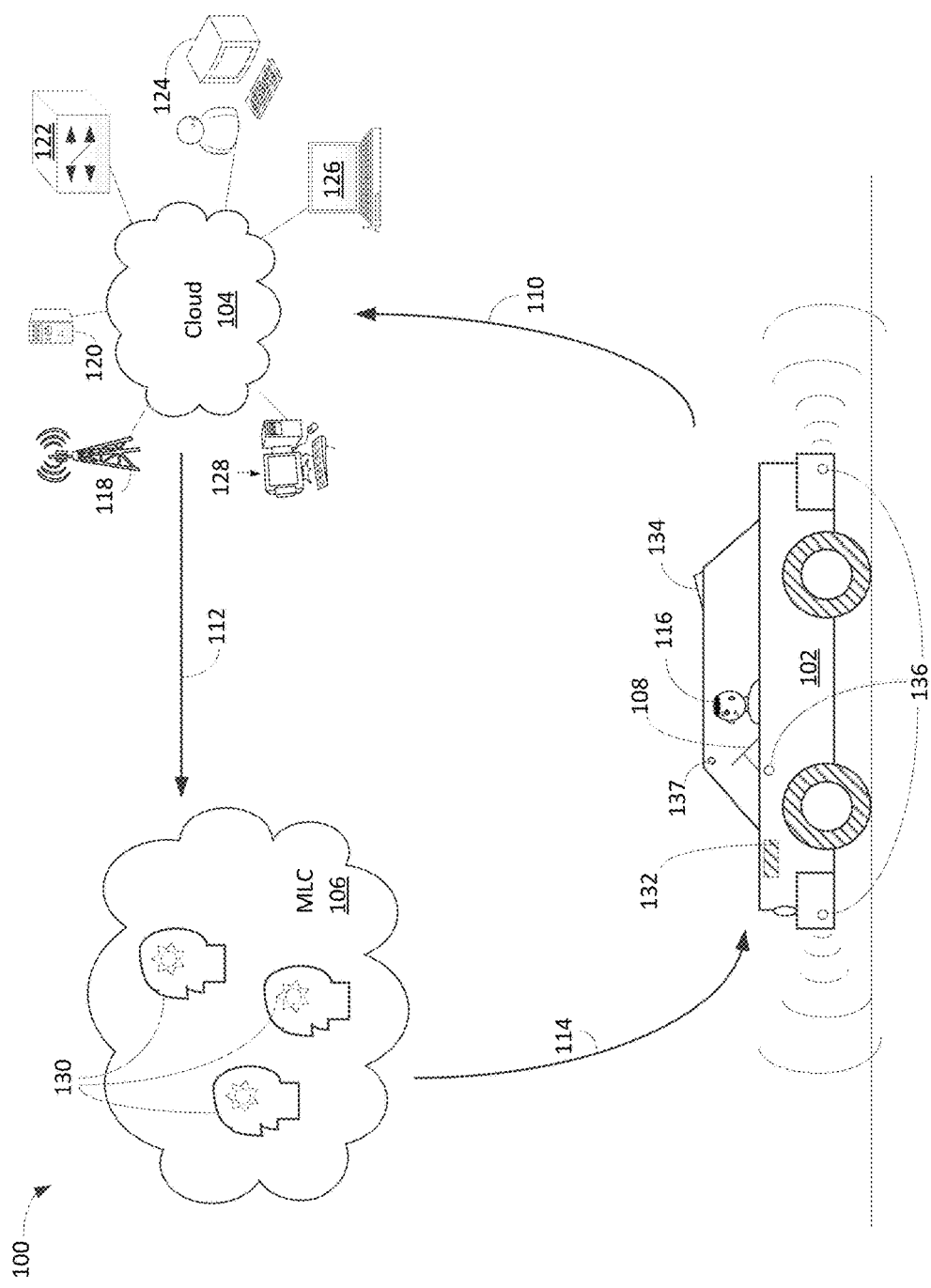
FIGS. 1A-F are block diagrams illustrating an operator behavior ("OB") system capable of detecting abnormal OB ("AOB") using a virtuous cycle in accordance with one embodiment of the present invention.

Embodiments of the present invention are described herein with context of a method and/or apparatus for facilitating detection of abnormal operator behavior ("AOB") using a virtuous cycle containing cloud based network, containerized sensing device, and machine learning ("ML").

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the presently claimed invention discloses an operator behavior system ("OBS") capable of detecting OB utilizing a virtuous cycle containing sensors, machine learning center ("MLC"), and cloud based network ("CBN"). In one aspect, the process monitors operator body language captured by interior sensors and captures surrounding information observed by exterior sensors onboard a vehicle as the vehicle is in motion. After selectively recording the captured data in accordance with an OB model generated by MLC, AOB is detected in accordance with vehicular status signals received by the OB model. Upon rewinding recorded operator body language and the surrounding information leading up to detection of AOB, labeled data associated with AOB is generated. The labeled data is subsequently uploaded to CBN for facilitating OB model training at MLC via a virtuous cycle.

FIG. 1A is a block diagram 100 illustrating an OB system capable of detection OB using a virtuous cycle in accordance with one embodiment of the present invention. Diagram 100 illustrates a virtuous cycle containing a vehicle 102, CBN 104, and MLC 106. In one aspect, MCL 106 can be located remotely or in the cloud. Alternatively, MCL 106 can be a part of CBN 104. It should be noted that the underlying concept of the exemplary embodiment(s) of the present invention would not change if one or more blocks (circuit or elements) were added to or removed from diagram 100.

Vehicle 102, in one example, can be a car, automobile, bus, train, drone, airplane, truck, and the like, and is capable of moving geographically from point A to point B. To simplify forgoing discussing, the term "vehicle" or "car" is used. Vehicle 102 includes wheels with ABS (anti-lock braking system), body, steering wheel 108, exterior or forward-looking cameras 136, interior or 360° (degree) interior camera 137, antenna 134, onboard controller 132, and operator (or driver) 116. It should be noted that interior and/or exterior cameras 136-137 can be installed at front, side-facing, stereo, and inside of vehicle 102. In one example, vehicle 102 also includes various sensors which senses information related to vehicle state, vehicle status, driver actions, For example, the sensors, not shown in FIG. 1A, are able to collect information, such as ABS, steering, braking, acceleration, traction control, windshield wipers, GPS (global positioning system), radar, ultrasound, lidar, and the like.

Onboard controller 132 includes CPU (central processing unit), GPU (graphic processing unit), memory, and disk responsible for gathering data from exterior cameras 136, interior cameras, audio sensor, ABS, traction control, steering wheel, CAN-bus sensors, and the like. In one aspect, controller 132 executes OB model received from MLC 106, and interfaces with antenna 134 to communicate with CBN 104 via a wireless communication network 110. Note that wireless communication network includes, but not limited to, WIFI, cellular network, Bluetooth network, satellite network, or the like. A function of controller 132 is to gather or capture real-time surrounding information when the vehicle is driving.

CBN 104 includes various digital computing systems, such as, but not limited to, server farm 120, routers/switches 122, cloud administrators 124, connected computing devices 126-128, and network elements 118. A function of CBN 104 is to provide cloud computing which can be viewed as on-demand Internet based computing service with enormous computing power and resources. A function of CBN 104 is to improve or refine OB labeled data via correlating captured real-time data with relevant cloud data. The refined OB labeled data is subsequently passed to MLC 106 for model training via a connection 112.

MLC 106, in one embodiment, provides, refines, trains, distributes models 130 such as OB model based on information or data such as OB labeled data provided from CBN 104. It should be noted that the machine learning makes predictions based on models generated and maintained by various computational algorithms using historical data as well as current data. A function of MLC 106 is that it is capable of pushing information such as revised OB model to vehicle 102 via a wireless communications network 114 in real-time.

To identify or detect a districted driver or operator 116 of a vehicle, an onboard OB model which could reside inside of controller 132 receives a triggering event or events from built-in sensors such as ABS, wheel slippery, engine status, and the like. The triggering event or events may include, but not limited to, activation of ABS, rapid steering, rapid breaking, excessive wheel slip, activation of emergency stop, and on. Upon receiving triggering events via vehicular status signals, the recording or recorded images captured by inward facing camera or 360 camera are rewound from an earlier time stamp leading to the receipt of triggering event(s) for identifying OB labeled data which contains images considered to be dangerous driving. After correlation of OB labeled data with historical sampling data at CBN, the OB model is retrained and refined at MLC. The retrained OB model is subsequently pushed back onto vehicle 102.

In operation, when the triggering events indicate a dangerous driving or dangerous event, such event indicates a dangerous driver or distracted driver. Upon detecting a dangerous event, CBN 104 issues waning signal to driver or operator 116 via, for instance, a haptic signal, or shock to operator 116 notifying driver 116 to be careful. In addition, the dangerous event or events are recorded for report. It should be noted that a report describing driver's behavior as well as number occurrence relating to dangerous events can be useful. For example, such report can be obtained by insurance company for insurance auditing, by law enforcement for accident prevention, by city engineers for traffic logistics, or by medical stuff for patient safety.

An advantage of using an OB system is to reduce traffic accidents and enhance public safety.

Figure 1B:
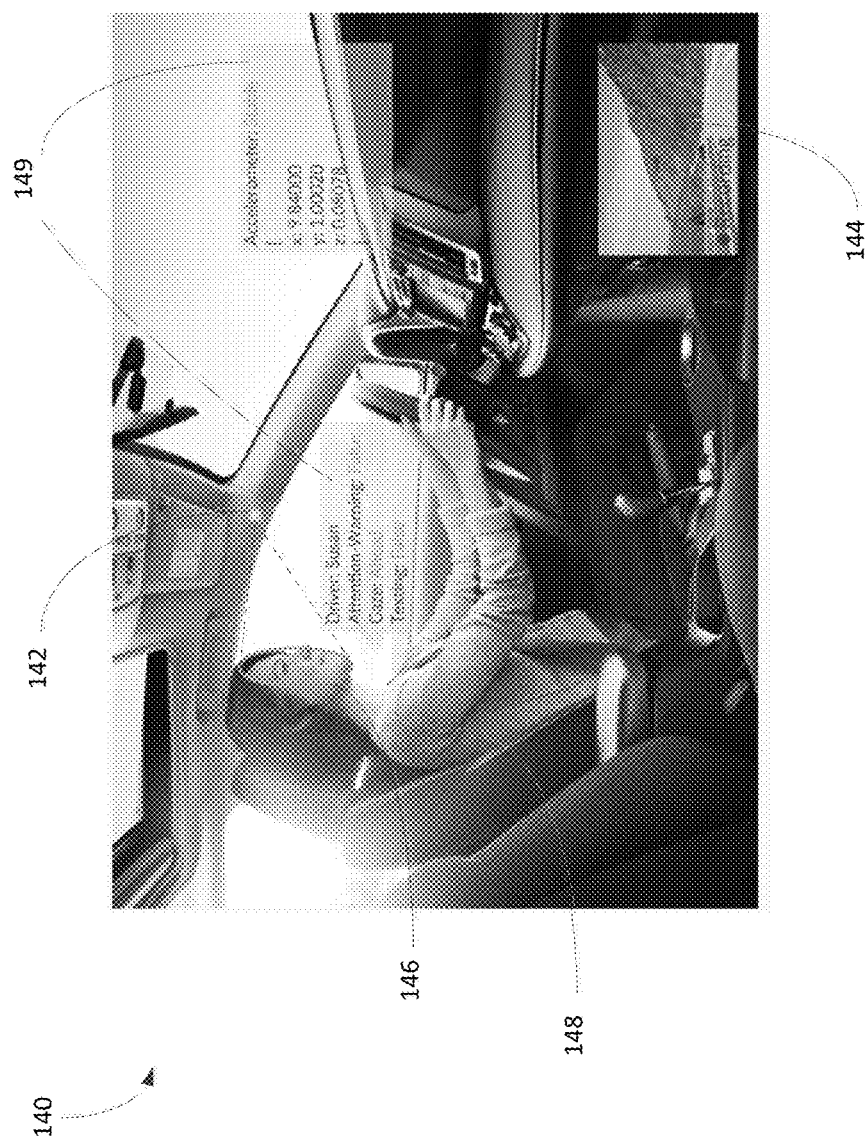

FIG. 1B illustrates a block diagram 140 showing an operator or driver monitored by an OB system via a virtuous cycle in accordance with one embodiment of the present invention. Diagram 140 illustrates a driver 148, interior camera or 360 camera 142, and exterior camera 144. In one aspect, camera 142 monitors or captures driver's facial expression 146 and/or driver (or operator) body language. Upon reading OB status 149 which indicates stable with accelerometer, ahead with gaze, hands on steering wheel (no texting), the OB system concludes that OB is normal.

In one embodiment, the OB system is able to detect distracted driver, texting, facial recognition, and driver restriction. It should be noted that the car may contain multiple forward facing cameras (or 360-degree camera(s)) capable of capturing a 360 view which can be used to correlate with other views to identify whether driver 148 looks back to see a car behind the driver or to look at the side when the car turns. Based on observed OB, the labeled data showing looking at the correct spots based on traveling route of car can illustrate where the danger is. Alternatively, the collected images or labeled data can be used to retrain OB model which may predict the safety rating for driver 148. It should be noted that the labeled data should include various safety parameters such as whether the driver looks left and right before crossing an intersection and/or whether the driver gazes at correct locations while driving.

It should be noted that sensor or sensors mean camera, Lidar, radar, sonar, thermometers, audio detector, pressure sensor, airflow, optical sensor, infrared reader, speed sensor, altitude sensor, and the like. OB can also change based on occupant(s) behavior in the vehicle or car. For example, if occupants are noisy, loud radio, shouting, drinking, eating, dancing, the occupants behavior can affect overall OB contributes to bad driving behavior.

Figure 1C:
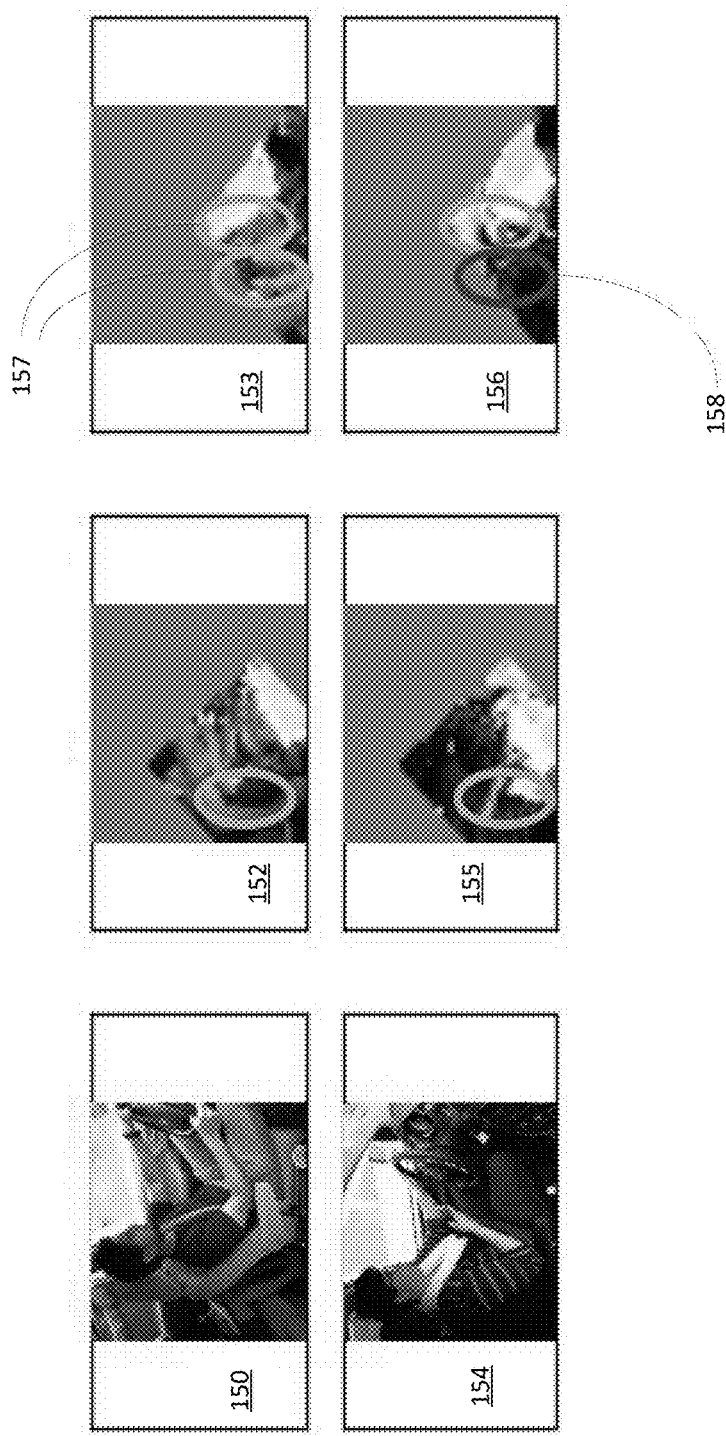

FIG. 1C illustrates a block diagrams 150-156 showing a comparison between a good or normal operator and a distracted operator or driver detected by an OB system via a virtuous cycle in accordance with one embodiment of the present invention. Diagrams 150-156 illustrate a continuous learning cloud capable of detecting a texting driver from a normal driver. For example, diagram 150 shows a normal driver who looks ahead and both of driver's hands are on the steering wheel. Diagram 152 is an isolated diagram showing driver's body language with both hands on the steering wheel. Diagram 153 is a blowup diagram showing both hands are on the steering wheel. Diagrams 154-156 show a texting driver wherein diagram 154 which is the original image shows the driver with one hand on the steering wheel while another hand is on the phone texting. Diagram 155 is an isolated diagram showing driver body language indicating one hand driving and one hand texting. Diagram 156 is a blowup diagram showing hands with one hand texting on the phone.

Figure 1D:
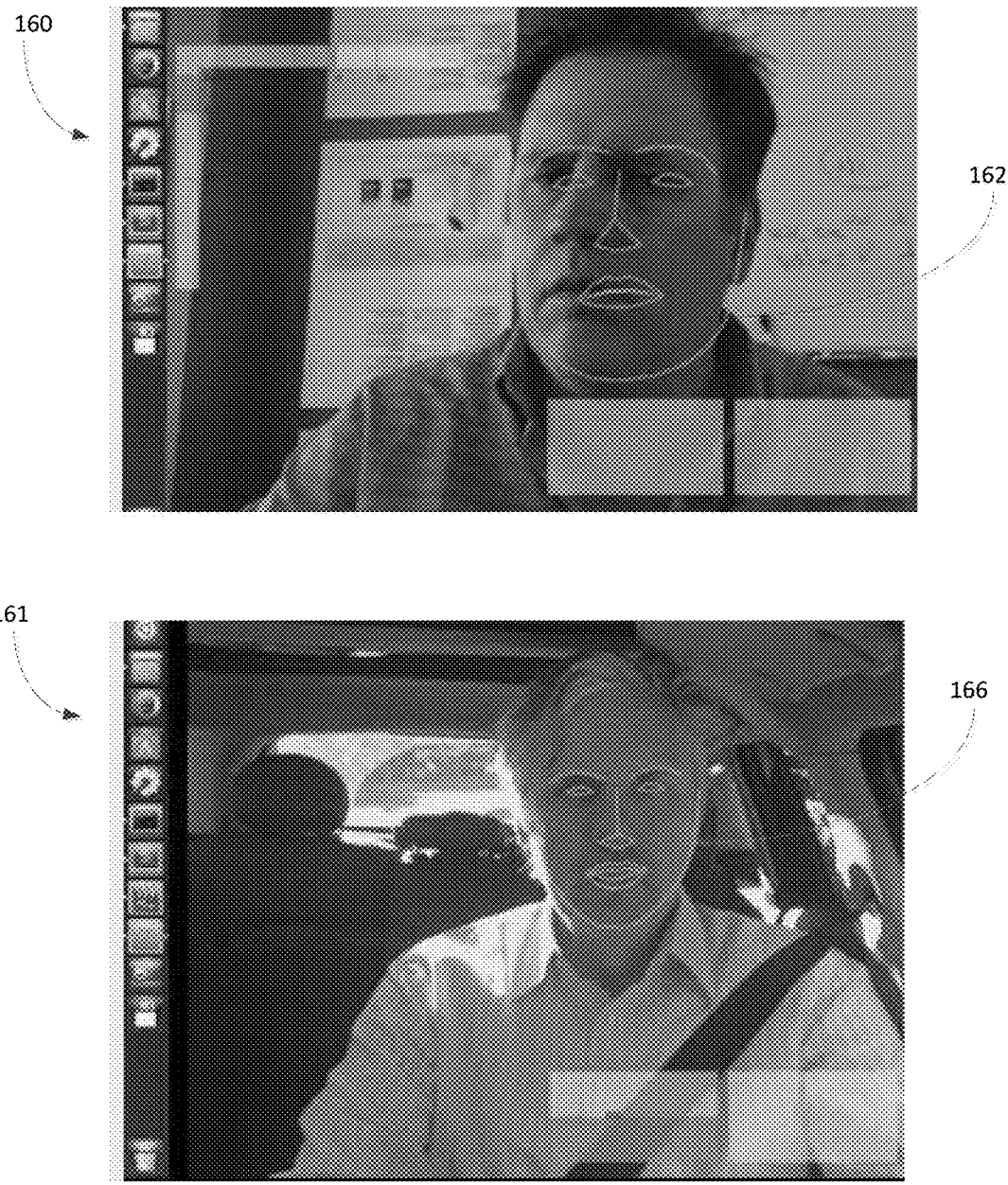

FIG. 1D illustrates diagrams 160-161 showing an operator or driver facial expression detected by the OB system via a virtuous cycle in accordance with one embodiment of the present invention. Diagram 160 illustrates driver or operator facial expression 162 which can be historical sampling data used to correlate with real-time activities or images. Diagram 161 illustrates driver or operator facial expression 166 showing driver gaze and posture. It should be noted that OB model runs in containerized camera in real-time. The camera or sensor can capture gaze and/or angled facial images.

Based on the facial expression with vehicular status signals indicating triggering event, the OB model can measure operator emotion and attention to conclude whether the operator is angry (i.e., road rage) or signs of incapacity.

Figure 1E:

FIG. 1E illustrates diagrams 170-172 showing non-distracted driver training and distracted driver training an operator or driver monitored by an OB system via a virtuous cycle in accordance with one embodiment of the present invention. Diagram 170 shows attention detection indicating non-distracted driver which can be used to train OB model. It should be noted that arbitrary camera location can be placed for model training. Diagram 172 shows attention detection training for distracted drivers wherein drivers are texting while driving. The OB model can be trained by learning to detect phone's position (or neural network learning to see phones) as to whether the phone is up or down.

Figure 1F:
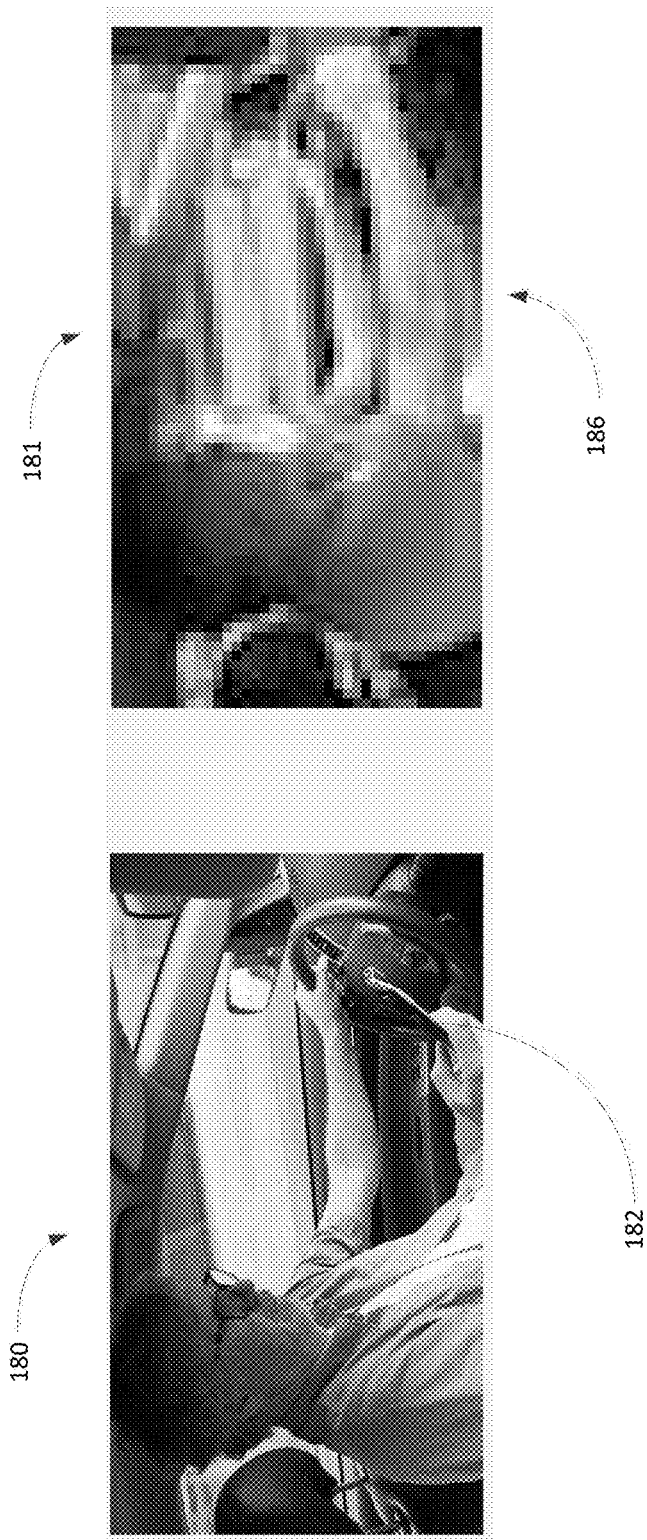

FIG. 1F illustrates diagrams 180-181 showing the OB system capable of throttling image resolution based on content-aware throttling mechanism. To minimizing bandwidth consumption storage consumption, the throttling mechanism which is controlled by the OB model is able to throttle resolution of images based on video content. For example, if the video content or images indicate that driver is not distracted, low quality or low resolution images are stored and/or uploaded. If the video content or images indicate the driver is distracted, higher quality or higher resolution images are stored and/or uploaded. Diagram 180 illustrates a higher resolution image because the driver is distracted since he is texting while driving as indicated by numeral 182. Diagram 186 illustrates a low resolution image because the driver is not distracted since, for example, both of driver hands are on the steering wheel as indicated by numeral 186. It should be noted that selective resolution is implemented based on distracted driver and facial expression.

Figure 1G:
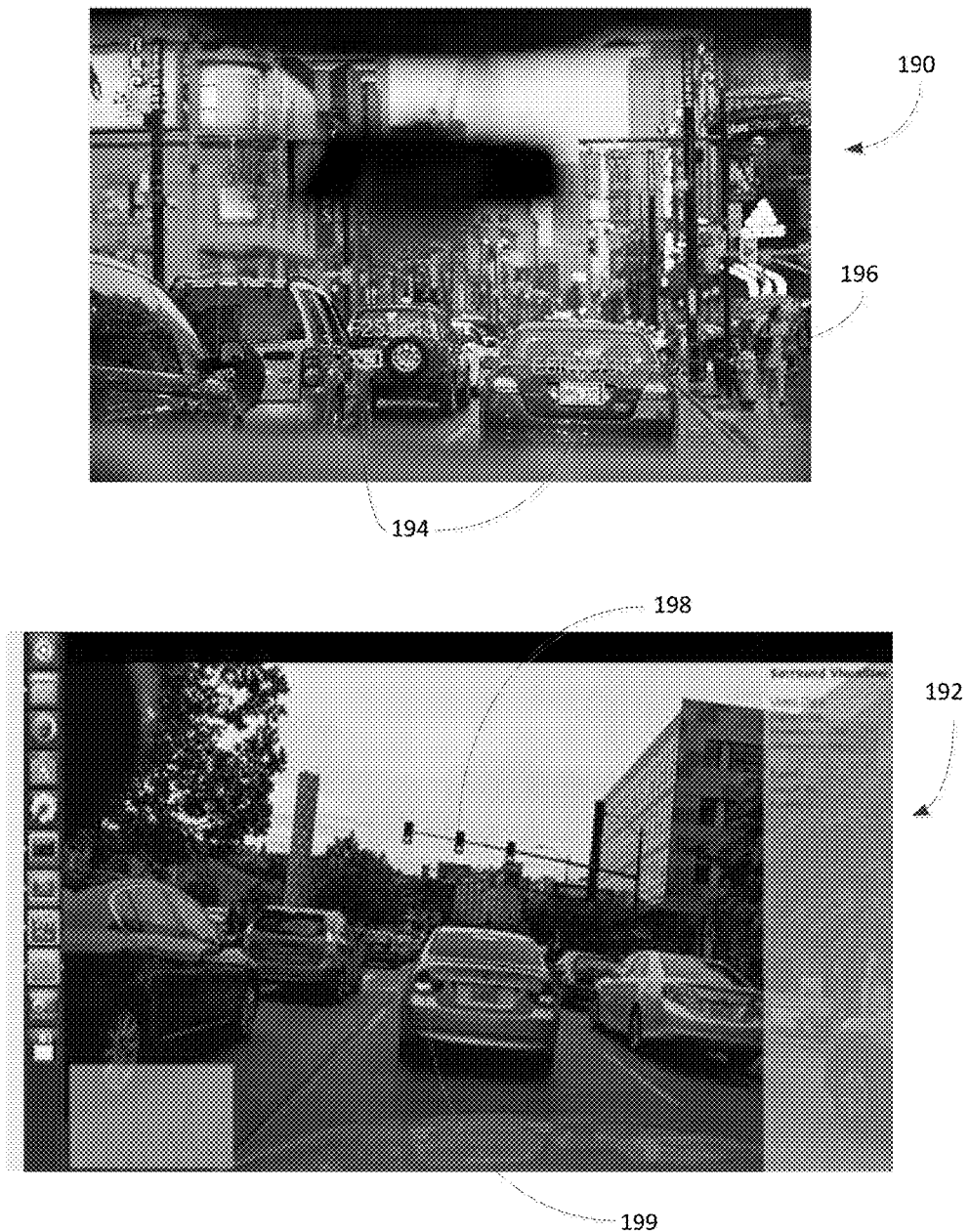
FIG. 1G is a block diagram illustrating a sign reading ("SR") system capable of reading a sign outside of vehicle using a virtuous cycle in accordance with one embodiment of the present invention.

FIG. 1G is block diagrams 190-192 illustrating a sign reading ("SR") system capable of reading a sign outside of vehicle using a virtuous cycle in accordance with one embodiment of the present invention. Diagram 190 includes license plates 194 observed by exterior camera(s) and projected license plate numbers 196 after analyzing by the SR system. Diagram 192 includes traffic lights 198 and braking lights 199 which can indicate that it is a red traffic light. In one embodiment, the SR system is able to read signs relying on municipal data maps that provide location information for traffic signs, electrical poles, lights, et cetera.

In operation, a car having a SR model passes a location known to have a traffic sign, electrical pole, light pole, etc. by consulting the municipal database. After the camera data is captured of the car approaching the sign, the camera images and type of sign from the municipal data are used as labeled data. For electrical poles with identification codes, the camera image can be labeled with the identification code. It should be noted that the value of electrical pole identification code recognition is that the electrical poles are very precisely located and so they can be used to correct GPS readings, particularly in areas where there are multi-path problems. Note also that to provide electrical pole recognition, side-view camera(s) is required on the car.

Alternatively, the SR system can also be used to identify stationary objects such as stores, retail locations, bridges, buildings, houses, light towers, landmarks, and so on. Upon correlating maps such as Google™ maps or open street maps for tags, the captured image can be relatively easy to train. For example, the SR system can be trained to identify nearby Starbucks™ or McDonald's™ in a certain geographic area. The SR system, in on example, can also be configured to recognize construction barriers and roadblocks to enhance operation safety.

Figure 2A:
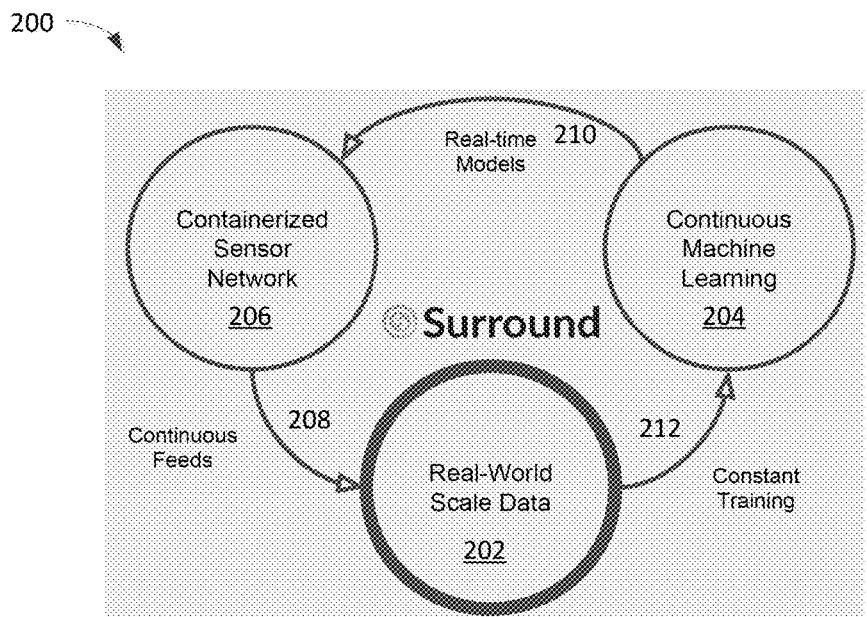
FIGS. 2A-2B are block diagrams illustrating a virtuous cycle capable of facilitating AOB detection in accordance with one embodiment of the present invention.

FIG. 2A is a block diagram 200 illustrating a virtuous cycle capable of detecting or monitoring OB in accordance with one embodiment of the present invention. Diagram 200, which is similar to diagram 100 shown in FIG. 1A, includes a containerized sensor network 206, real-world scale data 202, and continuous machine learning 204. In one embodiment, continuous machine learning 204 pushes real-time models to containerized sensor network 206 as indicated by numeral 210. Containerized sensor network 206 continuously feeds captured data or images to real-world scale data 202 with uploading in real-time or in a batched format. Real-world scale data 202 provides labeled data to continuous machine learning 204 for constant model training as indicated by numeral 212. It should be noted that the underlying concept of the exemplary embodiment(s) of the present invention would not change if one or more blocks (or elements) were added to or removed from FIG. 2A.

The virtuous cycle illustrated in diagram 200, in one embodiment, is configured to implement AOB system wherein containerized sensor network 206 is similar to vehicle 102 as shown in FIG. 1A and real-world scale data 202 is similar to CBN 104 shown in FIG. 1A. Also, continuous machine learning 204 is similar to MCL 106 shown in FIG. 1A. In one aspect, containerized sensor network 206 such as an automobile or car contains a containerized sensing device capable of collecting surrounding information or images using onboard sensors or sensor network when the car is in motion. Based on the OB model, selective recording the collected surrounding information is selectively recorded to a local storage or memory.

Real-world scale data 202, such as cloud or CBN, which is wirelessly coupled to the containerized sensing device, is able to correlate with cloud data and recently obtained OB data for producing labeled data. For example, real-world scale data 202 generates OB labeled data based on historical OB cloud data and the surrounding information sent from the containerized sensing device.

Continuous machine learning 204, such as MLC or cloud, is configured to train and improve OB model based on the labeled data from real-world scale data 202. With continuous gathering data and training OB model(s), the AOB system will be able to learn, obtain, and/or collect all available OBs for the population samples.

In one embodiment, a virtuous cycle includes partitionable Machine Learning networks, training partitioned networks, partitioning a network using sub-modules, and composing partitioned networks. For example, a virtuous cycle involves data gathering from a device, creating intelligent behaviors from the data, and deploying the intelligence. In one example, partition idea includes knowing the age of a driver which could place or partition "dangerous driving" into multiple models and selectively deployed by an "age detector." An advantage of using such partitioned models is that models should be able to perform a better job of recognition with the same resources because the domain of discourse is now smaller. Note that, even if some behaviors overlap by age, the partitioned models can have common recognition components.

It should be noted that more context information collected, a better job of recognition can be generated. For example, "dangerous driving" can be further partitioned by weather condition, time of day, traffic conditions, et cetera. In the "dangerous driving" scenario, categories of dangerous driving can be partitioned into "inattention", "aggressive driving", "following too closely", "swerving", "driving too slowly", "frequent breaking", deceleration, ABS event, et cetera.

For example, by resisting a steering behavior that is erratic, the car gives the driver direct feedback on their behavior—if the resistance is modest enough then if the steering behavior is intentional (such as trying to avoid running over a small animal) then the driver is still able to perform their irregular action. However, if the driver is texting or inebriated then the correction may alert them to their behavior and get their attention. Similarly, someone engaged in "road rage" who is driving too close to another car may feel resistance on the gas pedal. A benefit of using OB system is to identify consequences of a driver's "dangerous behavior" as opposed to recognizing the causes (texting, etc.). The Machine Intelligence should recognize the causes as part of the analysis for offering corrective action.

In one aspect, a model such as OB model includes some individual blocks that are trained in isolation to the larger problem (e.g. weather detection, traffic detection, road type, etc.). Combining the blocks can produce a larger model. Note that the sample data may include behaviors that are clearly bad (ABS event, rapid deceleration, midline crossing, being too close to the car in front, etc.). In one embodiment, one or more sub-modules are built. The models include weather condition detection and traffic detection for additional modules intelligence, such as "correction vectors" for "dangerous driving."

An advantage of using a virtuous cycle is that it can learn and detect object such as OB in the real world.

Figure 2B:
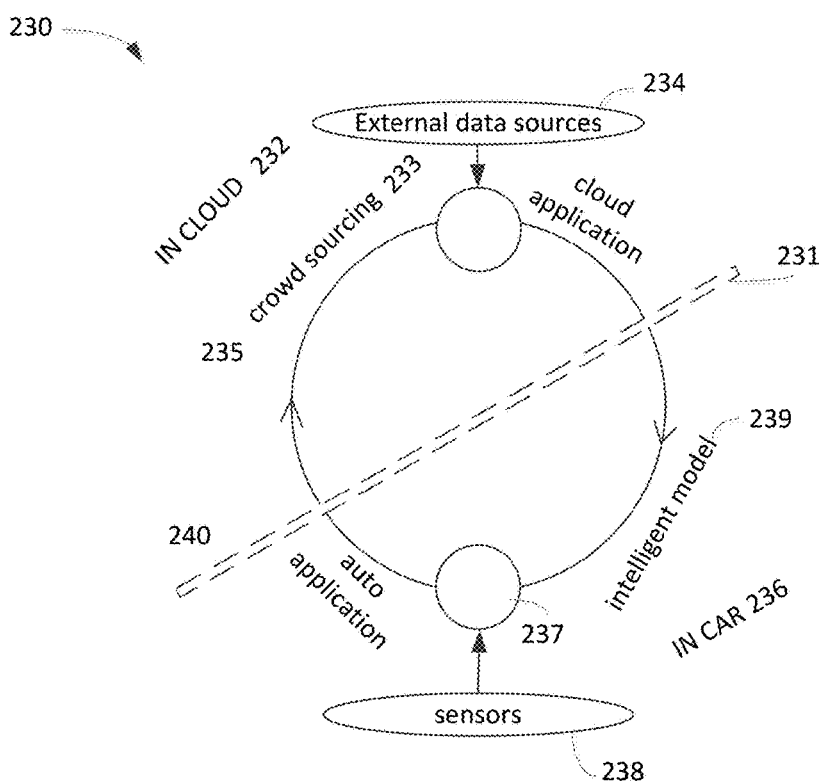

FIG. 2B is a block diagram 230 illustrating an alternative exemplary virtuous cycle capable of detecting OB in accordance with one embodiment of the present invention. Diagram 230 includes external data source 234, sensors 238, crowdsourcing 233, and intelligent model 239. In one aspect, components/activities above dotted line 231 are operated in cloud 232, also known as in-cloud component. Components/activities below dotted line 231 are operated in car 236, also known as in-device or in-car component. It should be noted that the underlying concept of the exemplary embodiment(s) of the present invention would not change if one or more blocks (or elements) were added to or removed from FIG. 2B.

In one aspect, in-cloud components and in-device components coordinate to perform desirable user specific tasks. While in-cloud component leverages massive scale to process incoming device information, cloud applications leverage crowd sourced data to produce applications. External data sources can be used to contextualize the applications to facilitate intellectual crowdsourcing. For example, in-car (or in-phone or in-device) portion of the virtuous cycle pushes intelligent data gathering to the edge application. In one example, edge applications can perform intelligent data gathering as well as intelligent in-car processing. It should be noted that the amount of data gathering may rely on sensor data as well as intelligent models which can be loaded to the edge.

Figure 3:
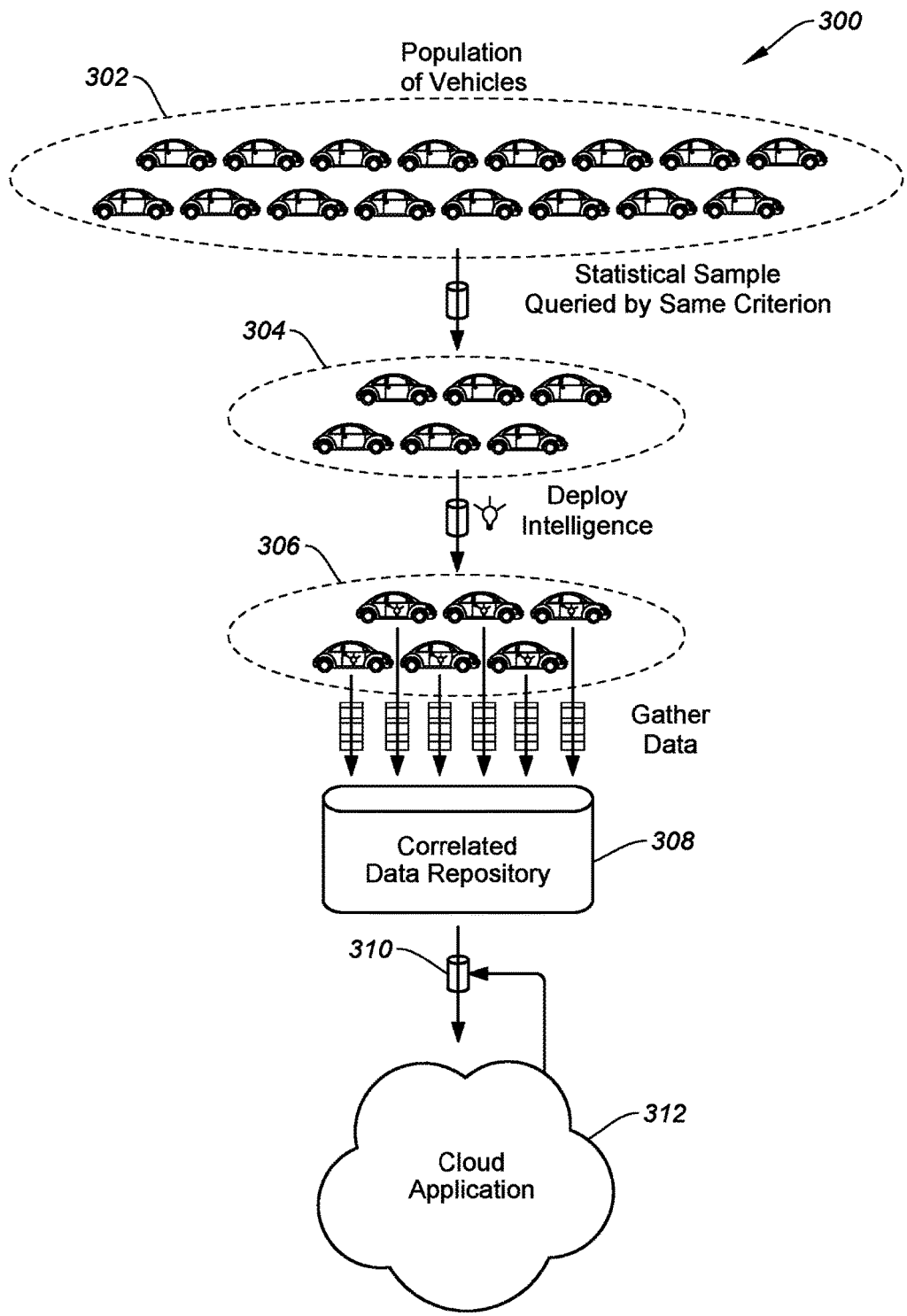
FIG. 3 is a block diagram illustrating a cloud based network using crowdsourcing approach to improve OB model(s) in accordance with one embodiment of the present invention.

FIG. 3 is a block diagram 300 illustrating a cloud based network using crowdsourcing approach to improve OB model(s) in accordance with one embodiment of the present invention. Diagram 300 includes population of vehicles 302, sample population 304, models deployment 306, correlation component 308, and cloud application 312. It should be noted that the underlying concept of the exemplary embodiment(s) of the present invention would not change if one or more blocks (or samples) were added to or removed from FIG. 3.

Crowdsourcing is a process of using various sourcing or specific models generated or contributed from other cloud or Internet users for achieving needed services. For example, crowdsourcing relies on the availability of a large population of vehicles, phones, or other devices to source data 302. For example, a subset of available devices such as sample 304 is chosen by some criterion such as location to perform data gathering tasks. To gather data more efficiently, intelligent models are deployed to a limited number of vehicles 306 for reducing the need of large uploading and processing a great deal of data in the cloud. It should be noted that the chosen devices such as cars 306 monitor the environment with the intelligent model and create succinct data about what has been observed. The data generated by the intelligent models is uploaded to the correlated data store as indicated by numeral 308. It should be noted that the uploading can be performed in real-time for certain information or at a later time for other types of information depending on the need as well as condition of network traffic.

Correlated component 308 includes correlated data storage capable of providing a mechanism for storing and querying uploaded data. Cloud applications 312, in one embodiment, leverage the correlated data to produce new intelligent models, create crowd sourced applications, and other types of analysis.

Figure 4:
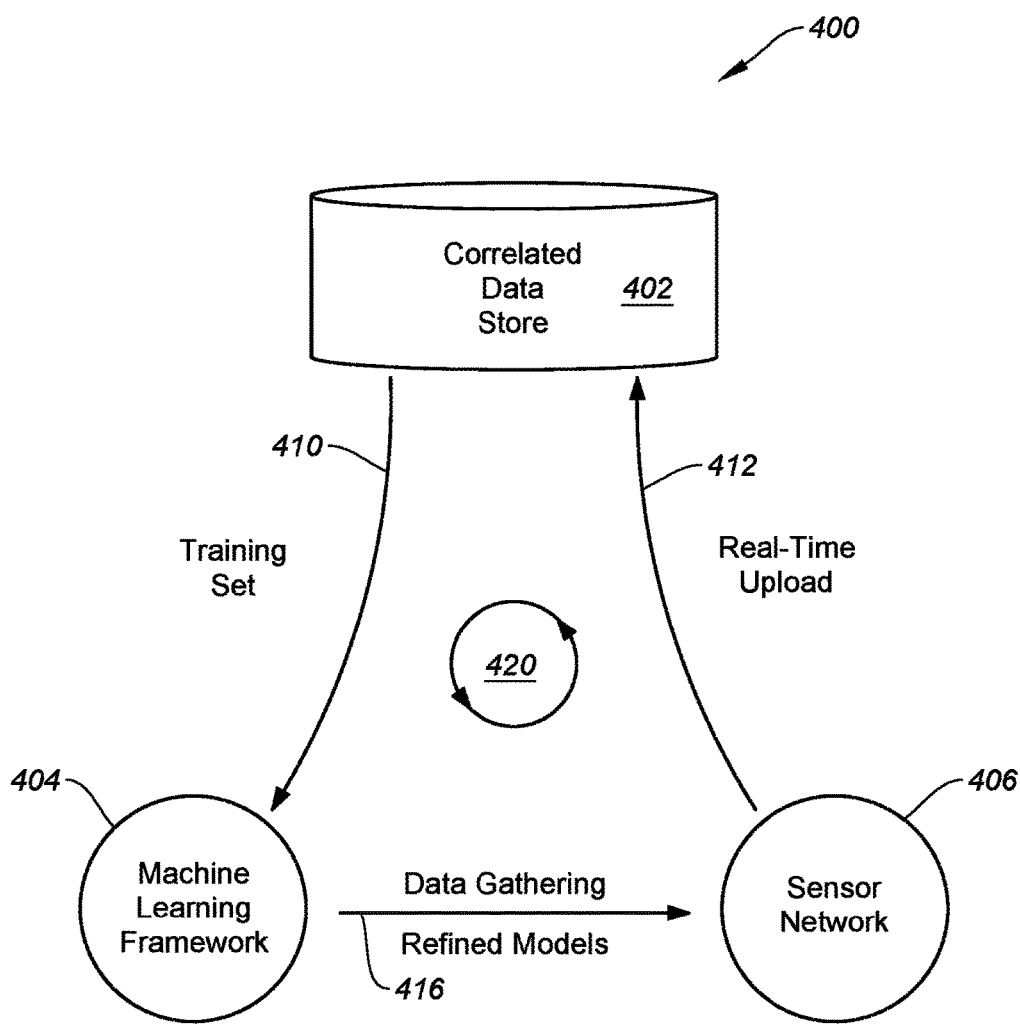
FIG. 4 is a block diagram illustrating an OB system using the virtuous cycle in accordance with one embodiment of the present invention.

FIG. 4 is a block diagram 400 illustrating an AOB system using the virtuous cycle in accordance with one embodiment of the present invention. Diagram 400 includes a correlated data store 402, machine learning framework 404, and sensor network 406. Correlated data store 402, machine learning framework 404, and sensor network 406 are coupled by connections 410-416 to form a virtuous cycle as indicated by numeral 420. It should be noted that the underlying concept of the exemplary embodiment(s) of the present invention would not change if one or more blocks (circuit or elements) were added to or removed from FIG. 4.

In one embodiment, correlated data store 402 manages real-time streams of data in such a way that correlations between the data are preserved. Sensor network 406 represents the collection of vehicles, phones, stationary sensors, and other devices, and is capable of uploading real-time events into correlated data store 402 via a wireless communication network 412 in real-time or in a batched format. In one aspect, stationary sensors includes, but not limited to, municipal cameras, webcams in offices and buildings, parking lot cameras, security cameras, and traffic cams capable of collecting real-time images.

The stationary cameras such as municipal cameras and webcams in offices are usually configured to point to streets, buildings, parking lots wherein the images captured by such stationary cameras can be used for accurate labeling. To fuse between motion images captured by vehicles and still images captured by stationary cameras can track object(s) such as car(s) more accurately. Combining or fusing stationary sensors and vehicle sensors can provide both labeling data and historical stationary sampling data also known as stationary "fabric". It should be noted that during the crowdsourcing applications, fusing stationary data (e.g. stationary cameras can collect vehicle speed and position) with real-time moving images can improve ML process.

Machine Learning ("ML") framework 404 manages sensor network 406 and provides mechanisms for analysis and training of ML models. ML framework 404 draws data from correlated data store 402 via a communication network 410 for the purpose of training modes and/or labeled data analysis. ML framework 404 can deploy data gathering modules to gather specific data as well as deploy ML models based on the previously gathered data. The data upload, training, and model deployment cycle can be continuous to enable continuous improvement of models.

Figure 5:
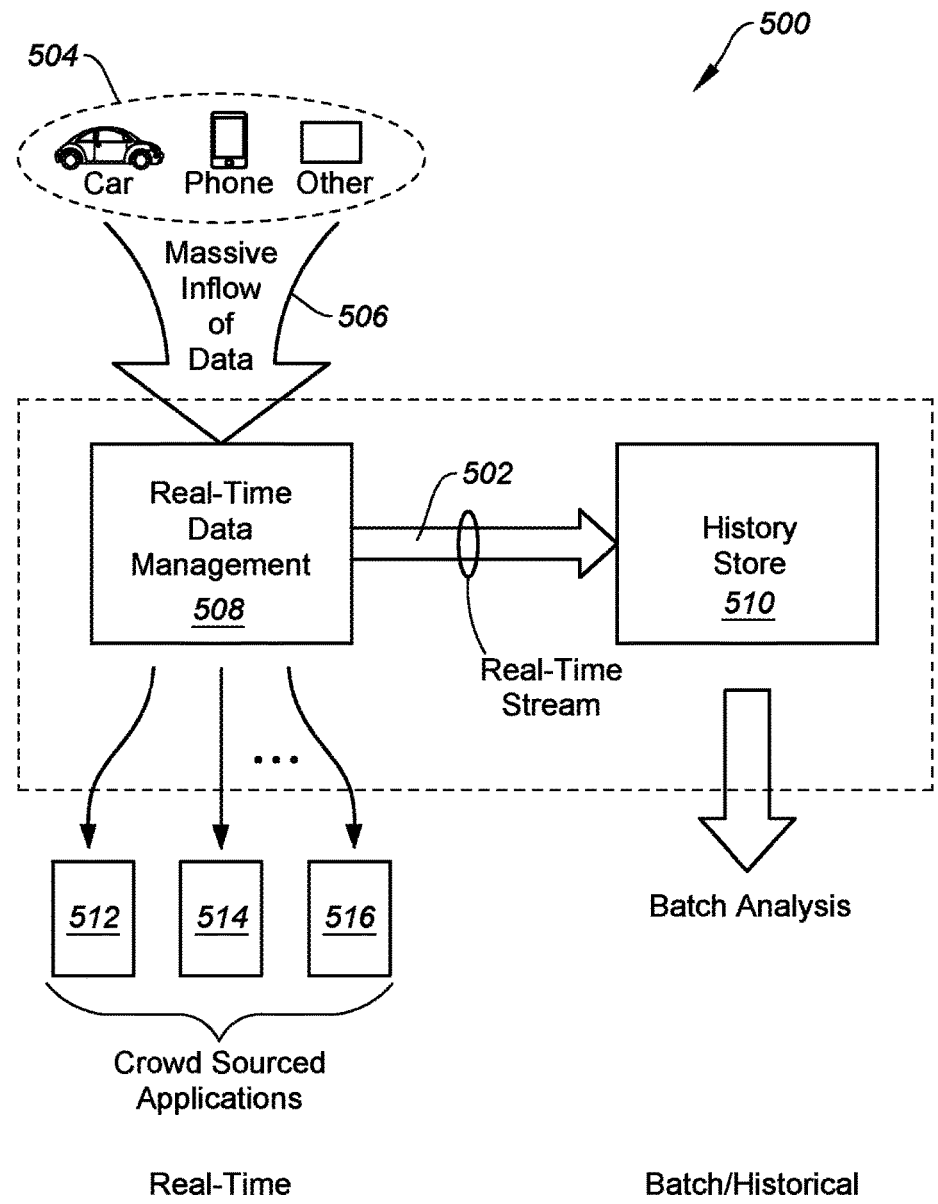
FIG. 5 is a block diagram illustrating an exemplary process of correlating OB data in accordance with one embodiment of the present invention.

FIG. 5 is a block diagram 500 illustrating an exemplary process of correlating OB data in accordance with one embodiment of the present invention. Diagram 500 includes source input 504, real-time data management 508, history store 510, and crowd sourced applications 512-516. In one example, source input 504 includes cars, phones, tablets, watches, computers, and the like capable of collecting massive amount of data or images which will be passed onto real-time data management 508 as indicated by numeral 506. It should be noted that the underlying concept of the exemplary embodiment(s) of the present invention would not change if one or more blocks (or elements) were added to or removed from FIG. 5.

In one aspect, a correlated system includes a real-time portion and a batch/historical portion. The real-time part aims to leverage new data in near or approximately real-time. Real-time component or management 508 is configured to manage a massive amount of influx data 506 coming from cars, phones, and other devices 504. In one aspect, after ingesting data in real-time, real-time data management 508 transmits processed data in bulk to the batch/historical store 510 as well as routes the data to crowd sourced applications 512-516 in real-time.

Crowd sourced applications 512-516, in one embodiment, leverage real-time events to track, analyze, and store information that can be offered to user, clients, and/or subscribers. Batch-Historical side of correlated data store 510 maintains a historical record of potentially all events consumed by the real-time framework. In one example, historical data can be gathered from the real-time stream and it can be stored in a history store 510 that provides high performance, low cost, and durable storage. In one aspect, real-time data management 508 and history store 510 coupled by a connection 502 are configured to perform OB data correlation as indicated by dotted line.

Figure 6:
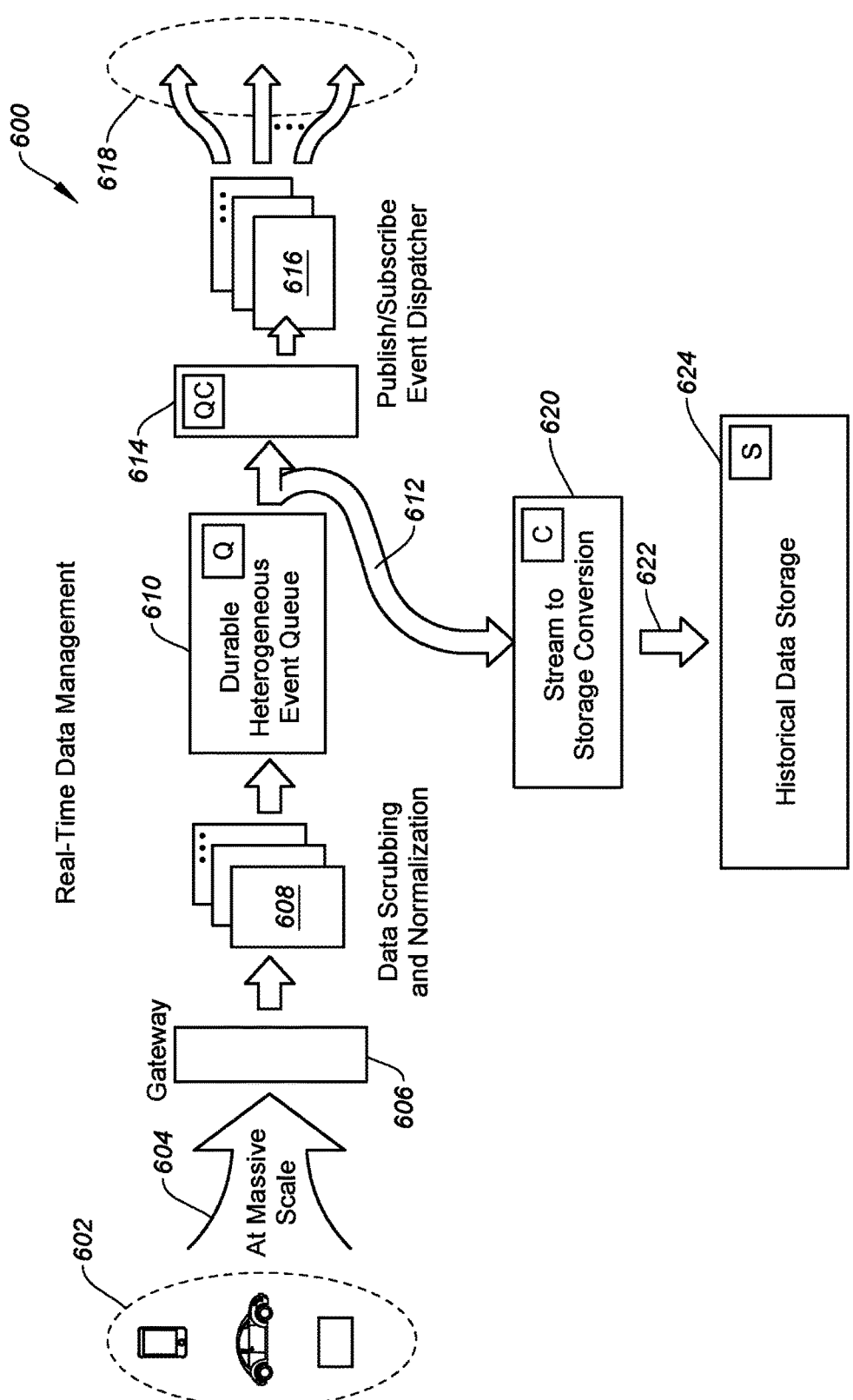
FIG. 6 is a block diagram illustrating an exemplary process of real-time data management for AOB in accordance with one embodiment of the present invention.

FIG. 6 is a block diagram 600 illustrating an exemplary process of real-time data for OB in accordance with one embodiment of the present invention. Diagram 600 includes data input 602, gateway 606, normalizer 608, queue 610, dispatcher 616, storage conversion 620, and historical data storage 624. The process of real-time data management further includes a component 614 for publish and subscribe. It should be noted that the underlying concept of the exemplary embodiment(s) of the present invention would not change if one or more blocks (circuit or elements) were added to or removed from FIG. 6.

The real-time data management, in one embodiment, is able to handle a large numbers (i.e., 10's of millions) of report events to the cloud as indicated by numeral 604. API (application program interface) gateway 606 can handle multiple functions such as client authentication and load balancing of events pushed into the cloud. The real-time data management can leverage standard HTTP protocols. The events are routed to stateless servers for performing data scrubbing and normalization as indicated by numeral 608. The events from multiple sources 602 are aggregated together into a scalable/durable/consistent queue as indicated by numeral 610. An event dispatcher 616 provides a publish/subscribe model for crowd source applications 618 which enables each application to look at a small subset of the event types. The heterogeneous event stream, for example, is captured and converted to files for long-term storage as indicated by numeral 620. Long-term storage 624 provides a scalable and durable repository for historical data.

Figure 7:
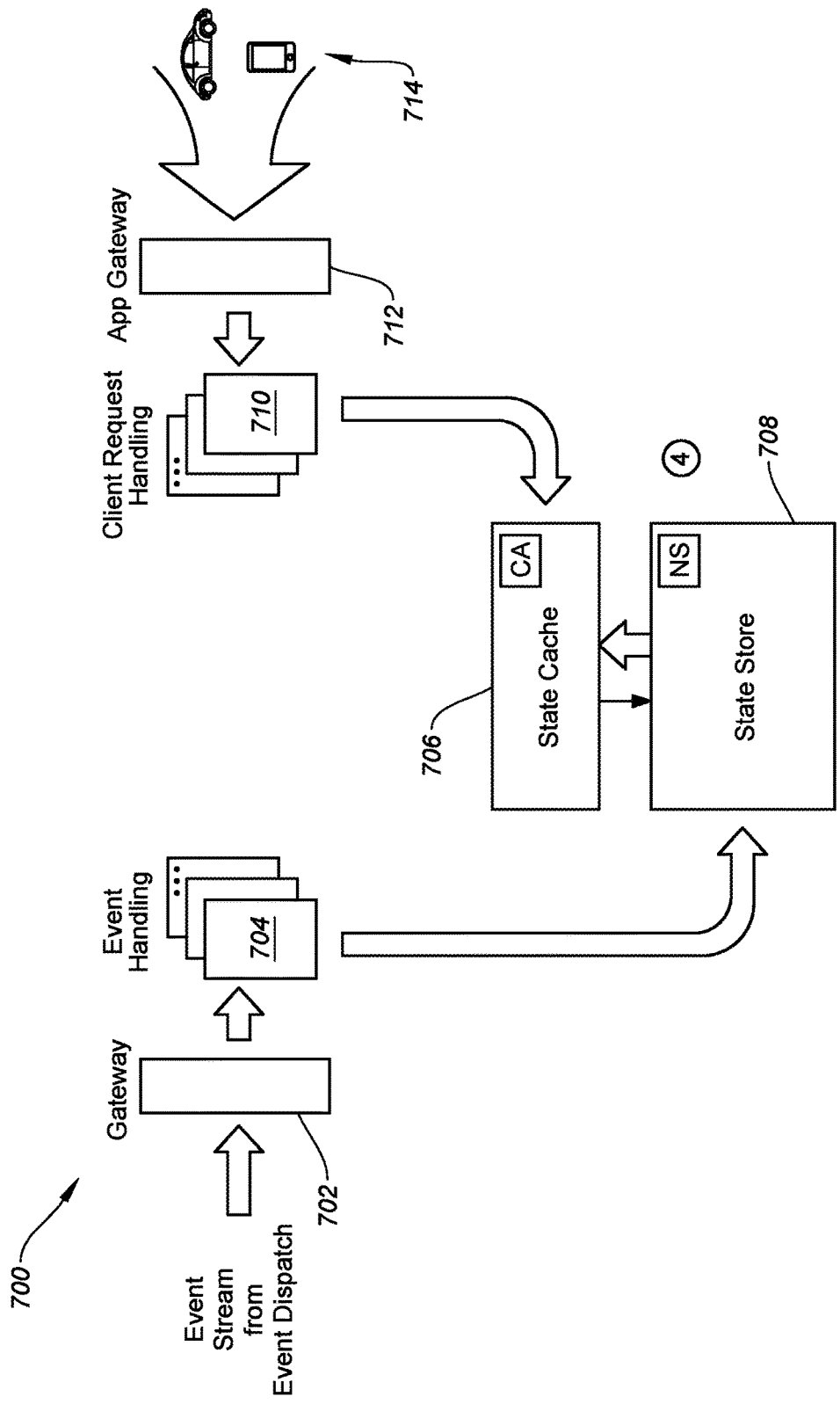
FIG. 7 is a block diagram illustrating a crowd sourced application model for AOB in accordance with one embodiment of the present invention.

FIG. 7 is a block diagram 700 illustrating a crowd sourced application model for OB in accordance with one embodiment of the present invention. Diagram 700 includes a gateway 702, event handler 704, state cache 706, state store 708, client request handler 710, gateway 712, and source input 714. In one example, gateway 702 receives an event stream from an event dispatcher and API gateway 712 receives information/data from input source 714. It should be noted that the underlying concept of the exemplary embodiment(s) of the present invention would not change if one or more blocks (or elements) were added to or removed from FIG. 7.

The crowd sourced application model, in one embodiment, facilitates events to be routed to a crowd source application from a real-time data manager. In one example, the events enter gateway 702 using a simple push call. Note that multiple events are handled by one or more servers. The events, in one aspect, are converted into inserts or modifications to a common state store. State store 708 is able to hold data from multiple applications and is scalable and durable. For example, State store 708, besides historical data, is configured to store present data, information about "future data", and/or data that can be shared across applications such as predictive AI (artificial intelligence).

State cache 706, in one example, is used to provide fast access to commonly requested data stored in state store 708. Note that application can be used by clients. API gateway 712 provides authentication and load balancing. Client request handler 710 leverages state store 708 for providing client data.

In an exemplary embodiment, an onboard OB model is able to handle real-time OB detection based on triggering events. For example, after ML models or OB models for OB detection have been deployed to all or most of the vehicles, the deployed ML models will report to collected data indicating OBs to the AOB system(s) for facilitating issuance of real-time warning for dangerous event(s). The information or data relating to the real-time dangerous event(s) or AOB is stored in state store 708. Vehicles 714 looking for OB detection can, for example, access the AOB system using gateway 712.

Figure 8:
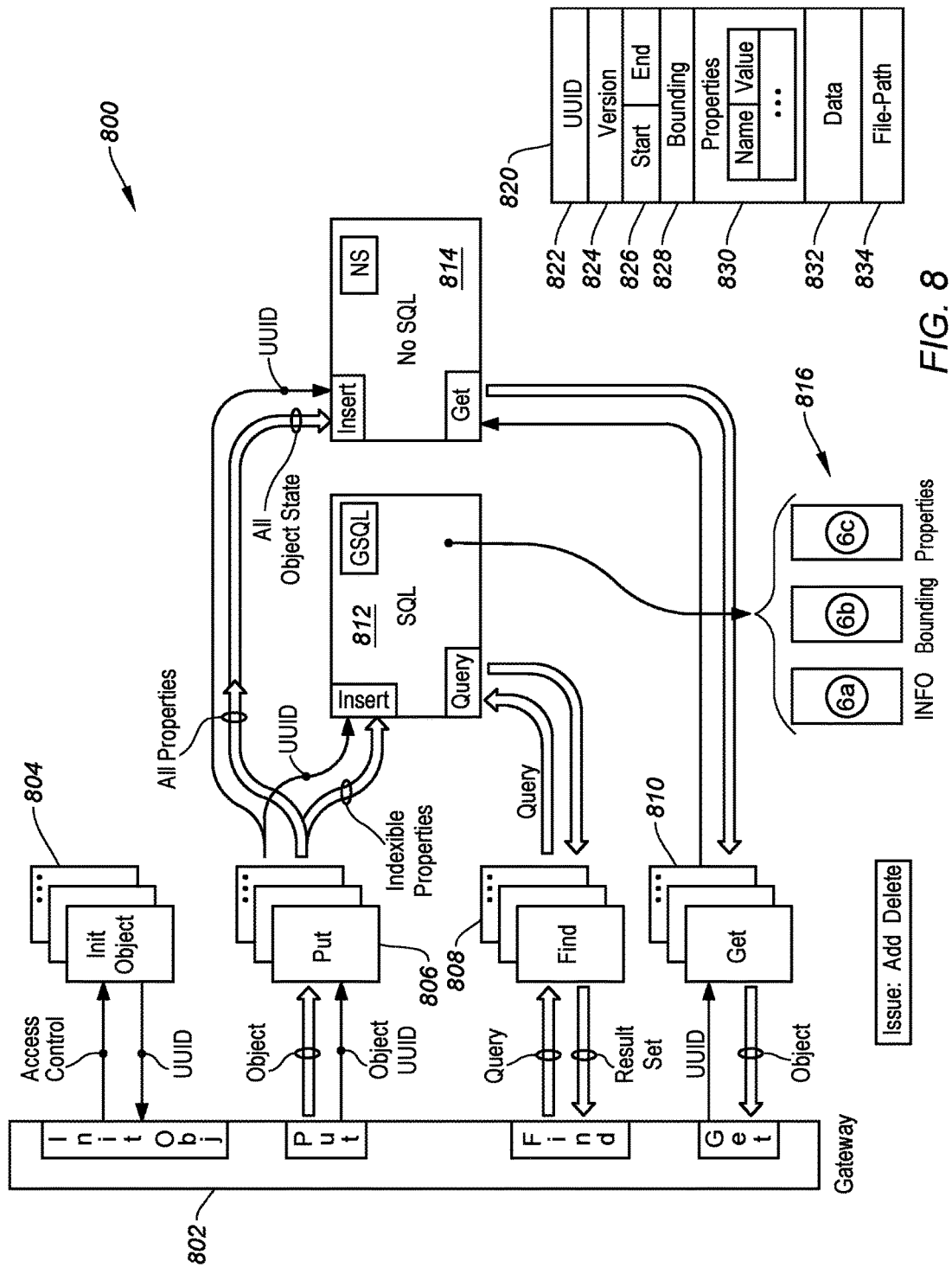
FIG. 8 is a block diagram illustrating a method of storing OB related data using a geo-spatial objective storage in accordance with one embodiment of the present invention.

FIG. 8 is a block diagram 800 illustrating a method of storing OB related data using a geo-spatial objective storage in accordance with one embodiment of the present invention. Diagram 800 includes gateway 802, initial object 804, put call 806, find call 808, get call 810, SQL (Structured Query Language) 812, non-SQL 814, and geo-spatial object storage 820. It should be noted that the underlying concept of the exemplary embodiment(s) of the present invention would not change if one or more blocks (circuit or elements) were added to or removed from FIG. 8.

Geo-spatial object storage 820, in one aspect, stores or holds objects which may include time period, spatial extent, ancillary information, and optional linked file. In one embodiment, geo-spatial object storage 820 includes UUID (universally unique identifier) 822, version 824, start and end time 826, bounding 828, properties 830, data 832, and file-path 834. For example, while UUID 822 identifies an object, all objects have version(s) 824 that allow schema to change in the future. Start and end time 826 indicates an optional time period with a start time and an end time. An optional bounding geometry 828 is used to specify spatial extent of an object. An optional set of properties 830 is used to specify name-value pairs. Data 832 can be binary data. An optional file path 834 may be used to associate with the object of a file containing relevant information such as MPEG (Moving Picture Experts Group) stream.

In one embodiment, API gateway 802 is used to provide access to the service. Before an object can be added to the store, the object is assigned an UUID which is provided by the initial object call. Once UUID is established for a new object, the put call 804 stores the object state. The state is stored durably in Non-SQL store 814 along with UUID. A portion of UUID is used as hash partition for scale-out. The indexible properties includes version, time duration, bounding, and properties which are inserted in a scalable SQL store 812 for indexing. The Non-SQL store 814 is used to contain the full object state. Non-SQL store 814 is scaled-out using UUID as, for example, a partition key.

SQL store 812 is used to create index tables that can be used to perform queries. SQL store 812 may include three tables 816 containing information, bounding, and properties. For example, information holds a primary key, objects void, creation timestamp, state of object and object properties "version" and "time duration." Bounding holds the bounding geometry from the object and the id of the associated information table entry. Properties hold property name/value pairs from the object stored as one name/value pair per row along with ID of associated info table entry.

Find call 808, in one embodiment, accepts a query and returns a result set, and issues a SQL query to SQL store 812 and returns a result set containing UUID that matches the query.

Figure 9:
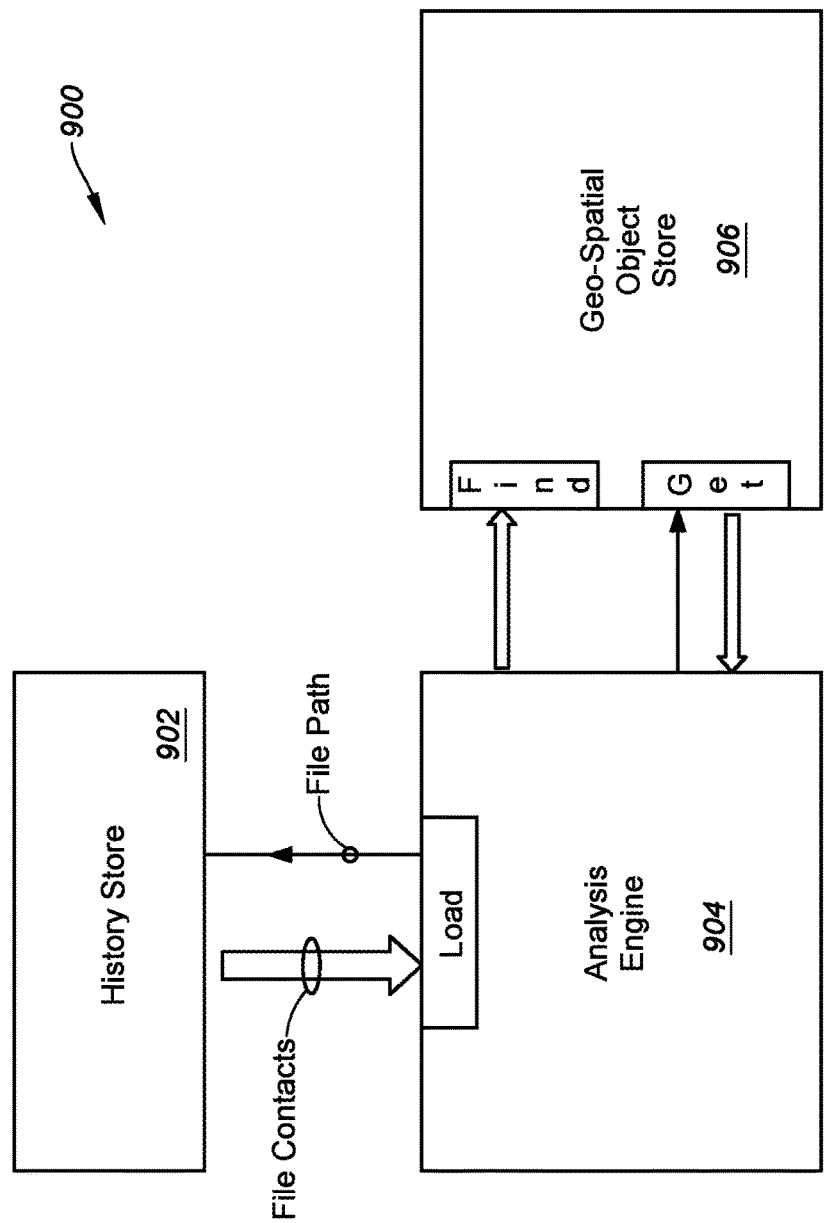
FIG. 9 is a block diagram illustrating an exemplary approach of analysis engine analyzing OB data in accordance with one embodiment of the present invention.

FIG. 9 is a block diagram 900 illustrating an exemplary approach of analysis engine analyzing OB data in accordance with one embodiment of the present invention. Diagram 900 includes history store 902, analysis engine 904, and geo-spatial object store 906. It should be noted that the underlying concept of the exemplary embodiment(s) of the present invention would not change if one or more blocks (circuit or elements) were added to or removed from FIG. 9.

In one aspect, diagram 900 illustrates analysis engine 904 containing ML training component capable of analyzing labeled data based on real-time captured OB data and historical data. The data transformation engine, in one example, interacts with Geo-spatial object store 906 to locate relevant data and with history store to process the data. Optimally, the transformed data may be stored.

It should be noted that virtuous cycle employing ML training component to provide continuous model training using real-time data as well as historical samples, and deliver OB detection model for one or more subscribers. A feature of virtuous cycle is able to continuous training a model and able to provide a real-time or near real-time result. It should be noted that the virtuous cycle is applicable to various other fields, such as, but not limited to, business intelligence, law enforcement, medical services, military applications, and the like.

Figure 10:
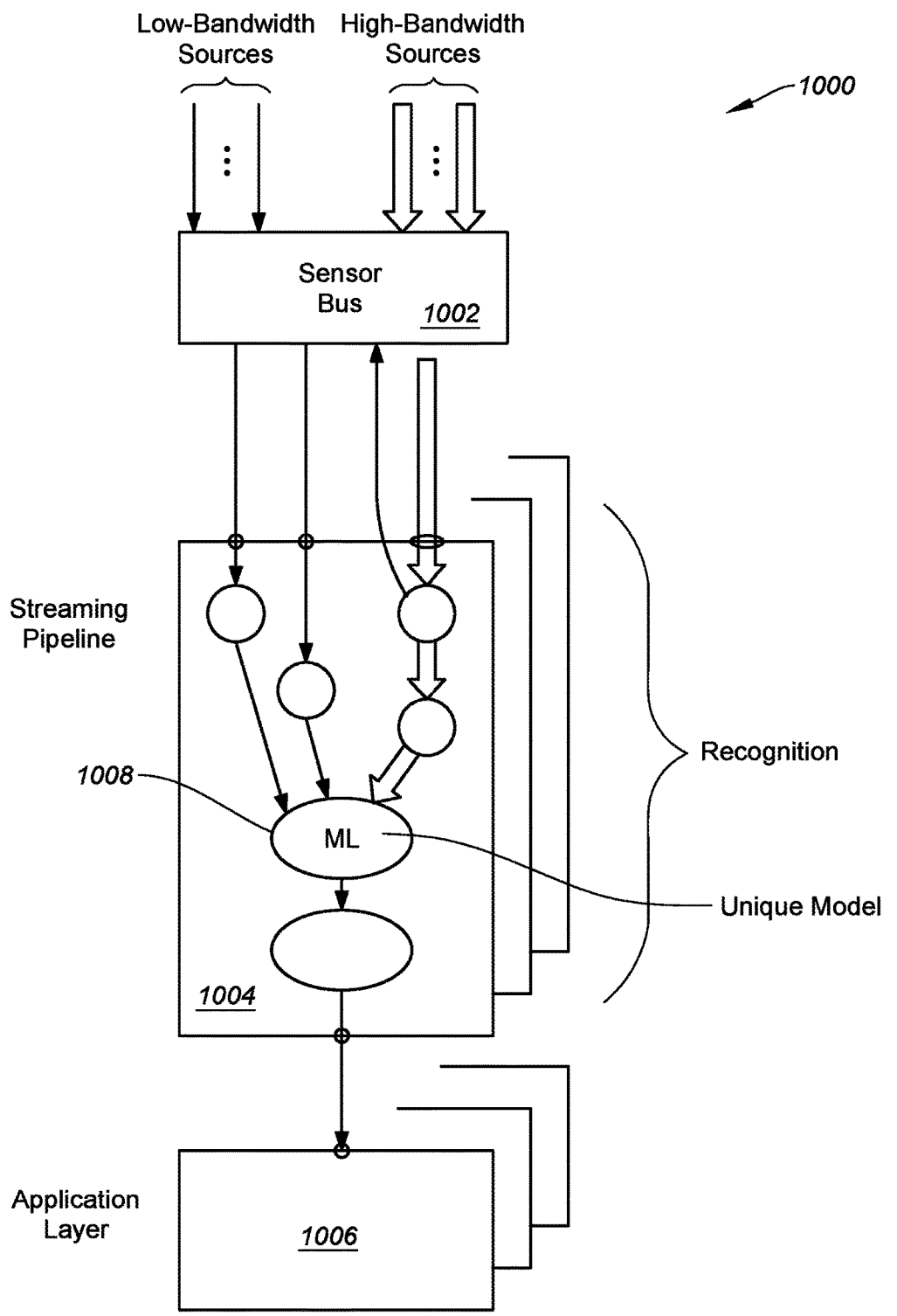
FIG. 10 is a block diagram illustrating an exemplary containerized sensor network used for sensing OB related information in accordance with one embodiment of the present invention.

FIG. 10 is a block diagram 1000 illustrating an exemplary containerized sensor network used for sensing OB related information in accordance with one embodiment of the present invention. Diagram 1000 includes a sensor bus 1002, streaming pipeline 1004, and application layer 1006 wherein sensor bus 1002 is able to receive low-bandwidth sources and high-bandwidth sources. Streaming pipeline 1004, in one embodiment, includes ML capable of generating unique model such as model 1008. It should be noted that the underlying concept of the exemplary embodiment(s) of the present invention would not change if one or more blocks (circuit or elements) were added to or removed from FIG. 10.

Figure 11:
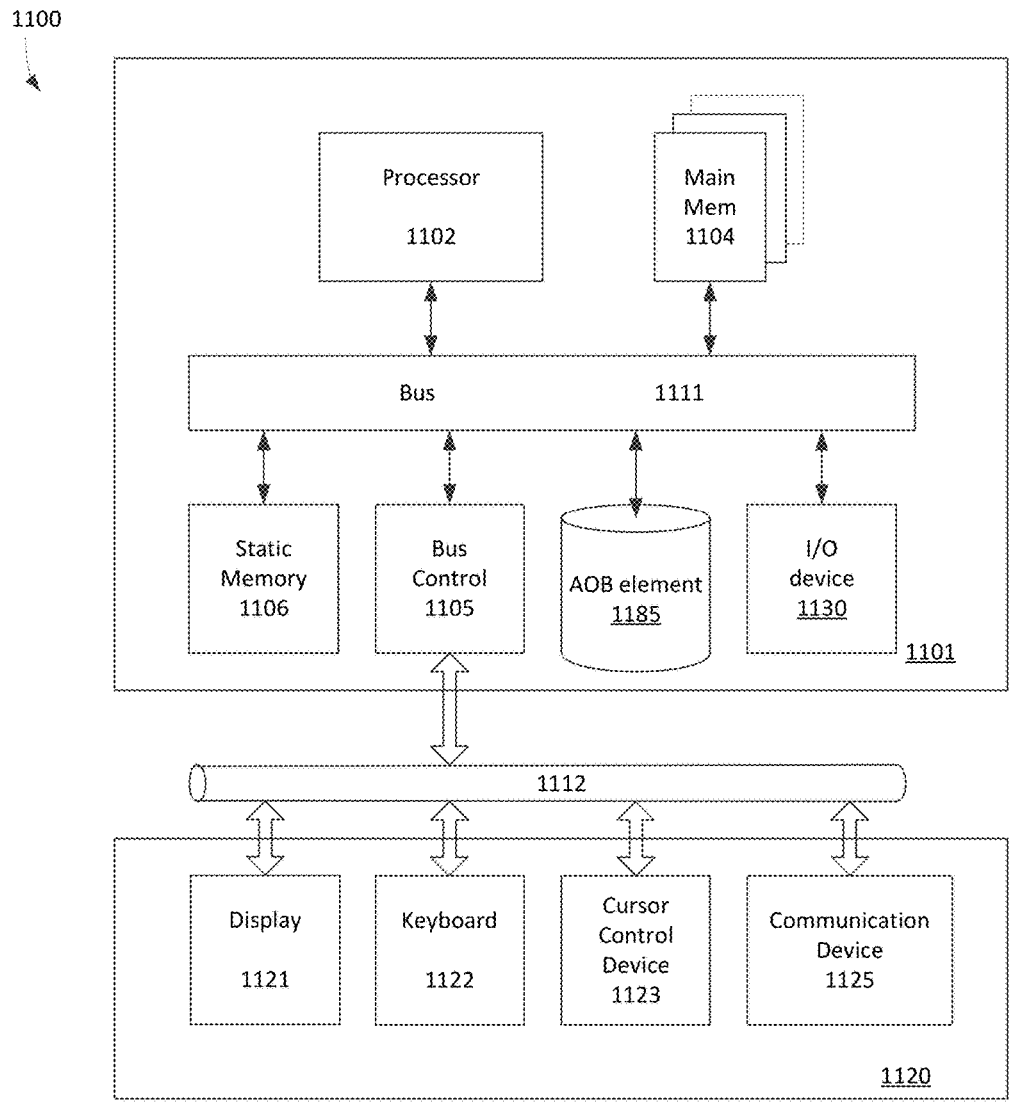
FIG. 11 is a block diagram illustrating a processing device or computer system which can be installed in a vehicle for facilitating the virtuous cycle in accordance with one embodiment of the present invention.

FIG. 11 is a block diagram 1100 illustrating a processing device or computer system which can be installed in a vehicle to support onboard cameras, CAN (Controller Area Network) bus, Inertial Measurement Units, Lidar, et cetera for facilitating virtuous cycle in accordance with one embodiment of the present invention. Computer system or OB system 1100 can include a processing unit 1101, an interface bus 1112, and an input/output ("IO") unit 1120. Processing unit 1101 includes a processor 1102, a main memory 1104, a system bus 1111, a static memory device 1106, a bus control unit 1105, I/O element 1130, and AOB element 1185. It should be noted that the underlying concept of the exemplary embodiment(s) of the present invention would not change if one or more blocks (circuit or elements) were added to or removed from FIG. 11.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112.

I/O unit 1120, in one embodiment, includes a display 1121, keyboard 1122, cursor control device 1123, and communication device 1125. Display device 1121 may be a liquid crystal device, cathode ray tube ("CRT"), touch-screen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

AOB element 1185, in one embodiment, is coupled to bus 1111, and configured to interface with the virtuous cycle for facilitating OB detection(s). For example, if OB system 1100 is installed in a car, AOB element 1185 is used to operate the OB model as well as interface with the cloud based network. If OB system 1100 is placed at the cloud based network, AOB element 1185 can be configured to handle the correlating process for generating labeled data.

Communication device 1125 is coupled to bus 1111 for accessing information from remote computers or servers, such as server 104 or other computers, through wide-area network 102. Communication device 1125 may include a modem or a network interface device, or other similar devices that facilitate communication between computer 1100 and the network. Computer system 1100 may be coupled to a number of servers via a network infrastructure such as the Internet.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 12:
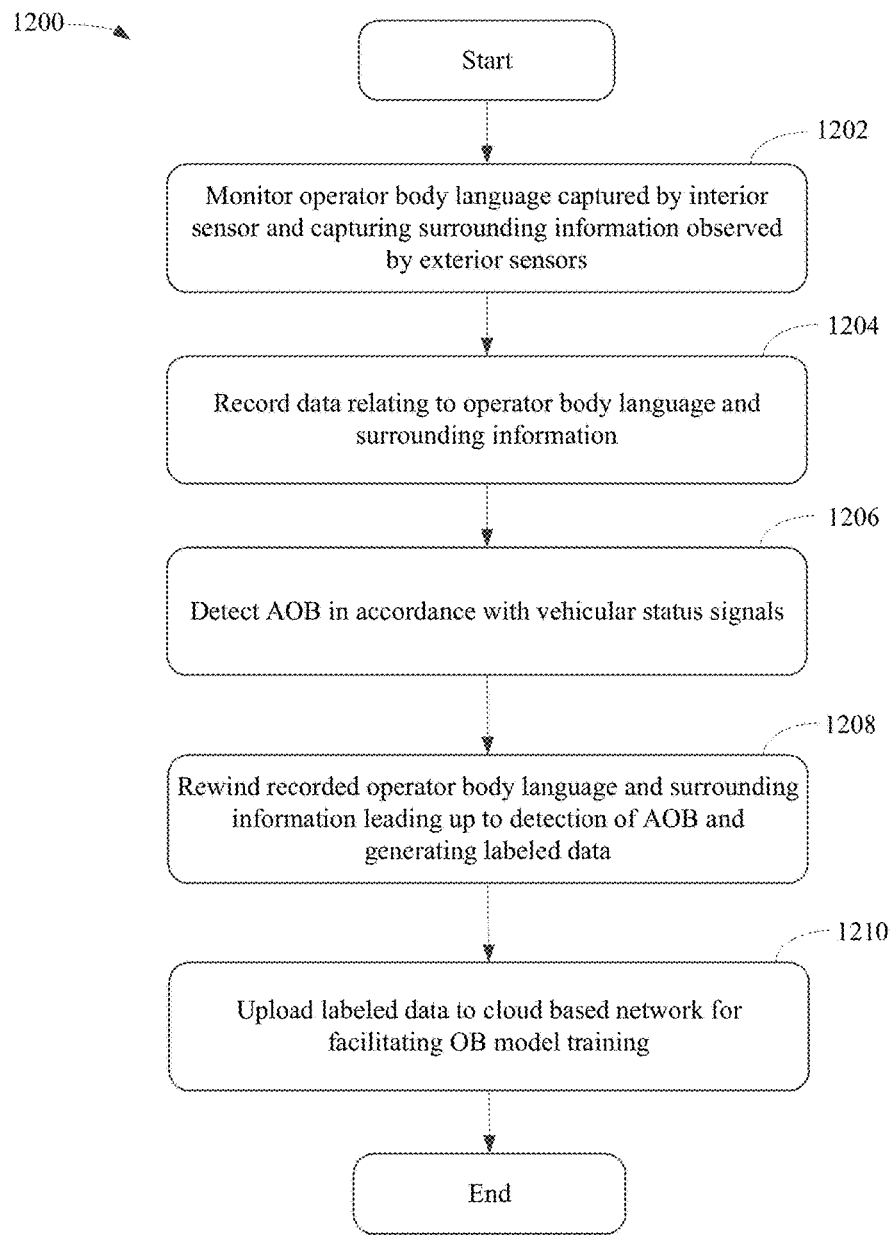
FIG. 12 is a flowchart illustrating a process of OB system capable of identifying AOB in accordance with one embodiment of the present invention.

FIG. 12 is a flowchart 1200 illustrating a process of OB system capable of identifying AOB in accordance with one embodiment of the present invention. At block 1202, a process monitors operator body language captured by interior sensors and captures surrounding information observed by exterior sensors onboard a vehicle as the vehicle is in motion. For example, an interior camera is activated to capture operator facial expression and activating a motion detector to detect operator body movement. Also, the outward-looking cameras situated on the vehicle are activated to capture images as the vehicle is in motion.

At block 1204, after selectively recording the captured data in accordance with an OB model generated by MLC, an AOB is detected at block 1206 in accordance with vehicular status signals received by the OB model. At block 1208, upon rewinding recorded operator body language and the surrounding information leading up to detection of AOB, labeled data associated with AOB is generated. At block 1210, the labeled data is subsequently uploaded to CBN for facilitating OB model training at MLC via a virtuous cycle.

In one aspect, after separating real-time data from the labeled data, the real-time data is uploaded to the cloud based network in real-time via a wireless communication network. Similarly, upon separating batched data from the labeled data, the batched data is uploaded to the cloud based network at a later time depending on traffic condition(s). After feeding real-time labeled data from the vehicle to the cloud based network for correlating and revising labeled data, the revised labeled data is subsequently forwarded to the machine learning center for training OB model. After training, the trained OB model is pushed to the vehicle for continuing data collection. In one example, after correlating the labeled data with location information, time stamp, and vicinity traffic condition obtained from the CBN to update correlated labeled data relating to the AOB, the labeled data is correlated with local events, additional sampling data, and weather conditions obtained from the cloud based network to update the correlated labeled data relating to the AOB. The process is capable of correlating the labeled data with historical body language samples relating to the operator body language of OB samples obtained from the CBN for update the correlated labeled data. For example, the labeled data is revised or correlated in response to one of historical samples relating to facial expression, hand movement, body temperature, and audio recording retrieved from the cloud based network.

The containerized OB model is trained in accordance with the correlated labeled data forwarded from the cloud based network to the machine learning center. Upon detecting an event of distracted driver in response to the correlated labeled data updated by the cloud based network, a warning signal is provided to the operator indicating the AOB based on the event of the distracted driver. The event of distracted driver is recorded or stored for future report. Note that the containerized OB model is pushed to an onboard digital processing unit in the vehicle via a wireless communication network.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method configured to detecting operator behavior ("OB") utilizing a plurality of sensors, machine learning center, and cloud based network, comprising:

monitoring operator body language of an operator captured by a set of interior sensors and capturing surrounding information observed by a set of exterior sensors onboard a vehicle as the vehicle is in motion;

selectively recording data relating to the operator body language and the surrounding information in accordance with a containerized OB model generated by a machine learning center ("MLC");

detecting an abnormal OB ("AOB") in accordance with vehicular status signals received by the OB model while the vehicle is in operating;

rewinding recorded operator body language and the surrounding information leading up to detection of the AOB and generating labeled data associated with the AOB;

uploading the labeled data to the cloud based network for facilitating OB model training at the MLC via a virtuous cycle; and correlating the labeled data with location information, time stamp, and vicinity traffic condition obtained from the cloud based network to update correlated labeled data relating to the AOB.

2. The method of claim 1, further comprising correlating the labeled data with local events, additional sampling data, and weather conditions obtained from the cloud based network to update the correlated labeled data relating to the AOB.

3. The method of claim 1, further comprising correlating the labeled data with historical body language samples relating to the operator body language of OB samples obtained from the cloud based network for update the correlated labeled data relating to the AOB.

4. The method of claim 3, wherein correlating the labeled data with historical body language samples includes revising labeled data in response to one of historical samples relating to facial expression, hand movement, body temperature, and audio recording retrieved from the cloud based network.

5. The method of claim 4, further comprising training the containerized OB model in accordance with the correlated labeled data forwarded from the cloud based network to the machine learning center.

6. The method of claim 4, further comprising detecting an event of distracted driver in response to the correlated labeled data updated by the cloud based network.

7. The method of claim 6, further comprising providing a warning signal to the operator indicating the AOB based on the event of the distracted driver;
and recording the event of distracted driver for future report.

8. The method of claim 1, further comprising pushing the containerized OB model to an onboard digital processing unit in the vehicle via a wireless communication network.

9. The method of claim 1, wherein monitoring operator body language of an operator captured by a set of interior sensor includes activating an interior camera to capture operator facial expression and activating a motion detector to detect operator body movement.

10. The method of claim 1, wherein capturing surrounding information observed by a set of exterior sensors onboard a vehicle includes activating outward-looking cameras situated on the vehicle to capture images as the vehicle is in motion.

11. The method of claim 1, wherein uploading the labeled data to the cloud based network includes separating real-time data from the labeled data and uploading the real-time data to the cloud based network in real-time via a wireless communication network.

12. The method of claim 11, wherein uploading the labeled data to the cloud based network includes separating batched data from the labeled data and uploading the batched data to the cloud based network at a later time.

13. The method of claim 1, wherein uploading the labeled data to the cloud based networking for facilitating a machine learning process within a virtuous cycle includes,
feeding real-time labeled data from the vehicle to the cloud based network for correlating and revising labeled data;
forwarding revised labeled data to the machine learning center for training OB model; and
pushing a trained OB model to the vehicle for continuing data collection.

14. A method configured to detecting operator behavior ("OB") utilizing a plurality of sensors, machine learning center, and cloud based network, comprising:
monitoring operator body language of an operator captured by a set of interior sensors and capturing surrounding information observed by a set of exterior sensors onboard a vehicle as the vehicle is in motion;
selectively recording data relating to the operator body language and the surrounding information in accordance with a containerized OB model generated by a machine learning center ("MLC");
detecting an abnormal OB ("AOB") in accordance with vehicular status signals received by the OB model while the vehicle is in operating;
rewinding recorded operator body language and the surrounding information leading up to detection of the AOB and generating labeled data associated with the AOB; and
uploading the labeled data to the cloud based network for facilitating OB model training at the MLC via a virtuous cycle;
wherein uploading the labeled data to the cloud based networking for facilitating a machine learning process within a virtuous cycle includes,
feeding real-time labeled data from the vehicle to the cloud based network for correlating and revising labeled data;
forwarding revised labeled data to the machine learning center for training OB model; and
pushing a trained OB model to the vehicle for continuing data collection.

* * * * *